(12) United States Patent
Osborn et al.

(10) Patent No.: US 11,758,909 B2
(45) Date of Patent: Sep. 19, 2023

(54) ANTIMICROBIAL NONWOVEN POLYAMIDES WITH ZINC CONTENT

(71) Applicant: Ascend Performance Materials Operations LLC, Houston, TX (US)

(72) Inventors: Scott E. Osborn, Pensacola, FL (US); Wai-shing Yung, Pensacola, FL (US); Albert Ortega, Pensacola, FL (US)

(73) Assignee: Ascend Performance Materials Operations LLC, Houston, TX (US)

( * ) Notice: Subject to any disclaimer, the term of this patent is extended or adjusted under 35 U.S.C. 154(b) by 675 days.

(21) Appl. No.: 16/719,308

(22) Filed: Dec. 18, 2019

(65) Prior Publication Data

US 2020/0187498 A1    Jun. 18, 2020

Related U.S. Application Data

(60) Provisional application No. 62/781,233, filed on Dec. 18, 2018.

(51) Int. Cl.
| | | |
|---|---|---|
| *A01N 57/00* | (2006.01) | |
| *A01N 59/16* | (2006.01) | |
| *D01D 5/098* | (2006.01) | |
| *D04H 3/009* | (2012.01) | |
| *D01F 8/12* | (2006.01) | |
| *D04H 1/4334* | (2012.01) | |

(52) U.S. Cl.
CPC ............ *A01N 57/00* (2013.01); *A01N 59/16* (2013.01); *D01D 5/0985* (2013.01); *D01F 8/12* (2013.01); *D04H 1/4334* (2013.01); *D04H 3/009* (2013.01); *D10B 2331/02* (2013.01); *D10B 2401/13* (2013.01); *Y10T 442/607* (2015.04)

(58) Field of Classification Search
None
See application file for complete search history.

(56) References Cited

U.S. PATENT DOCUMENTS

| | | |
|---|---|---|
| 3,228,898 A | 1/1966 | Gerhard et al. |
| 3,704,198 A | 11/1972 | Prentice |
| 3,755,527 A | 8/1973 | Keller et al. |

(Continued)

FOREIGN PATENT DOCUMENTS

| | | | |
|---|---|---|---|
| CN | 107497182 A | 12/2017 | |
| DE | 202013004980 U1 * | 8/2013 | ............ B32B 5/022 |

(Continued)

OTHER PUBLICATIONS

"Kirk-Othmer", Encyclopedia of Chemical Technology, vol. 18, 3rd Edition, 1982, pp. 328-371.

(Continued)

*Primary Examiner* — Marla D McConnell
*Assistant Examiner* — Kevin Worrell
(74) *Attorney, Agent, or Firm* — COZEN O'CONNOR

(57) ABSTRACT

The present disclosure relates to a nonwoven polyamide structure having antimicrobial properties comprising: nonwoven polyamide fibers comprising less than 4000 ppm zinc dispersed within the nonwoven polyamide fibers; and less than 2000 ppm phosphorus. The fibers have an average fiber diameter of less than 25 microns; and the polyamide structure demonstrates a *Staphylococcus Aureus* reduction of at least 90%, as measured by ISO 20743-13.

17 Claims, 6 Drawing Sheets

(56) References Cited

U.S. PATENT DOCUMENTS

| | | | |
|---|---|---|---|
| 3,849,241 A | 11/1974 | Butin et al. | |
| 3,978,185 A | 8/1976 | Buntin et al. | |
| 4,100,324 A | 7/1978 | Anderson et al. | |
| 4,237,034 A | 12/1980 | Tomka et al. | |
| 4,663,220 A | 5/1987 | Wisneski et al. | |
| 4,701,518 A | 10/1987 | Osborn et al. | |
| 4,760,129 A | 7/1988 | Haering et al. | |
| 5,411,710 A | 5/1995 | Iwasyk | |
| 5,504,185 A | 4/1996 | Toki et al. | |
| 5,543,495 A | 8/1996 | Anolick et al. | |
| 5,698,658 A | 12/1997 | Dujari et al. | |
| 5,913,993 A | 6/1999 | Ortega et al. | |
| 6,011,134 A | 1/2000 | Marks et al. | |
| 6,013,275 A | 1/2000 | Konagaya et al. | |
| 6,136,947 A | 10/2000 | Wiltzer et al. | |
| 6,169,162 B1 | 1/2001 | Bush et al. | |
| 6,584,668 B2 | 7/2003 | Green et al. | |
| 7,074,482 B1 | 7/2006 | Nishimura et al. | |
| 7,138,482 B2 | 11/2006 | Tanaka et al. | |
| 7,300,272 B1 | 11/2007 | Haggard | |
| 7,381,788 B2 | 6/2008 | Tsujii et al. | |
| 8,668,854 B2 | 3/2014 | Marshall et al. | |
| 8,759,475 B2 | 6/2014 | Thierry et al. | |
| 8,777,599 B2 | 7/2014 | Peno et al. | |
| 8,808,594 B1 | 8/2014 | Marshall et al. | |
| 2004/0197553 A1* | 10/2004 | Foss | B32B 27/18 428/359 |
| 2006/0234049 A1* | 10/2006 | Van Dun | D01F 8/12 428/364 |
| 2018/0022920 A1* | 1/2018 | Nakai | C08K 7/02 524/733 |

FOREIGN PATENT DOCUMENTS

| | | | | |
|---|---|---|---|---|
| EP | 1270776 | | 1/2003 | |
| EP | 2530120 | | 12/2012 | |
| GB | 928286 A | | 6/1963 | |
| JP | 2011-132628 A | | 7/2011 | |
| JP | 2014145140 A | * | 8/2014 | |
| WO | WO-9415463 A1 | * | 7/1994 | A01N 25/26 |
| WO | 9510940 | | 4/1995 | |
| WO | 9522577 | | 8/1995 | |
| WO | WO-2016140240 A1 | * | 9/2016 | C08G 69/06 |
| WO | 2017/214085 | | 12/2017 | |
| WO | 2020014585 | | 1/2020 | |

OTHER PUBLICATIONS

Bresee et al., "Fiber Formation During Melt Blowing", International Nonwoven Journal, Summer, 2003, pp. 21-28.

Ellison et al., "Melt Blown Nanofibers: Fiber Diameter Distributions and Onset of Fiber Breakup", Polymer, vol. 48, No. 11, May 21, 2007, pp. 3306-3316.

Glasscock et al., "High Performance Polyamides Fulfill Demanding Requirements for Automotive Thermal Management Components", (DuPont), retrieved from http://www2.dupont.com/Automotive/en_US/assets/downloads/knowledg e%20center/HTN-whitepaper-R8.pdf available online Jun. 10, 2016, 9 pages.

Hassan et al., "Fabrication of Nanofiber Meltblown Membranes and Their Filtration Properties", Journal of Membrane Science, vol. 427, Jan. 15, 2013, pp. 336-344.

Panthi et al., "Interior Synthesizing of ZnO Nanoflakes Inside Nylon-6 Electrospun Nanofibers", Journal of Applied Polymer Science, vol. No. 127, Issue 3, May 10, 2012, pp. 2025-2032.

International Application No. PCT/US2019/067073, "International Search Report and Written Opinion", dated Mar. 20, 2020, 15 pages.

International Application No. PCT/US2019/067078, "International Search Report and Written Opinion", dated Mar. 23, 2020, 15 pages.

\* cited by examiner

ANTIMICROBIAL NONWOVEN POLYAMIDES WITH ZINC CONTENT

CROSS-REFERENCE TO RELATED APPLICATION

This application is related to and claims priority to U.S. Provisional Patent Application No. 62/781,233 filed Dec. 18, 2018, which is incorporated herein by reference.

FIELD

The present disclosure relates to nonwoven polyamides having permanent antimicrobial properties. In particular, the present disclosure relates to antimicrobial nonwoven polyamides comprising unique antimicrobial component(s).

BACKGROUND

There is a growing interest in fabrics having antimicrobial properties. In some instances, a number of treatments or coatings are applied to fibers to impart antimicrobial properties to fabrics. Compounds containing copper, silver, gold, or zinc, either individually or in combination, have been used in these applications to effectively combat pathogens such as bacteria, mold, mildew, virus, spores, and fungus.

These types of antimicrobial fibers and fabrics may be used in many industries including healthcare, hospitality, military, and athletics, among others. However, conventional antimicrobial fibers and fabrics have difficulties in meeting many of the other requirements of these applications. Additionally, many purported antimicrobial fabrics do not have sufficient antimicrobial properties, nor do they retain these properties for the lifetime of the product in which they are utilized. In some instances, the antimicrobial additives may have adverse environmental consequences by leaching from the fabric.

For example, in the healthcare and hospitality industries, certain fabrics are required to be sanitary at all times. To comply with these sanitation standards, the fabrics are subject to daily washing and, often times, bleaching. As another example, athletic wear is susceptible to bacterial growth due to both internal and external factors, and sweat and bacteria transmitted through the skin can lead to the growth of bacteria in clothing fibers. In some cases, these bacteria lead to unpleasant odors, staining, fabric deterioration, and even physical irritation, such as skin allergies and skin infections. Thus, in many applications repeated cycles of use and washing are quite common. Unfortunately, conventional fabrics have been found to deteriorate and lose antimicrobial properties during repeated uses and/or wash cycles.

As one example of conventional antimicrobial yarns and fabrics, U.S. Pat. No. 6,584,668 discloses durable non-electrically conductive metal treatments applied to yarns and textile fabrics. The durable non-electrically conductive metal treatments are coatings or finishes applied to yarns and textile fabrics. The metal treatments may include silver and/or silver ions, zinc, iron, copper, nickel, cobalt, aluminum, gold, manganese, magnesium, and the like. The metal treatments are applied to the exterior surface of the yarn or fabric as a coating or film.

In addition, U.S. Pat. No. 4,701,518 discloses an antimicrobial nylon prepared in water with a zinc compound (ZnO) and phosphorus compound to form carpet fibers. The process produces nylon fibers for carpets having 18 denier per filament (dpf), and are prepared by conventional melt polymerization. Such carpet fibers typically have average diameters that are well above 30 microns, which are generally unsuitable for next-to-skin applications.

Conventional polymer formulations, e.g., the aforementioned nylon formulations, have been known to be difficult to process, especially in cases where smaller fibers (and lower denier) are desired, e.g., in nonwoven applications. For example, the conventional formulations that comprise, for example, nylon and various other additives, may require higher die pressures to form the smaller diameter fibers, which may, in turn, lead to detrimental fiber interruptions. In some cases, typical polymer formulations have relative viscosities that are too high to effectively process and may require adjustment, which may reduce overall efficiency.

Although some references may teach the use of antimicrobial fibers and fabrics, a need still exists for antimicrobial fibers and fabrics that retain their antimicrobial properties after multiple washes, while maintaining fiber strength and still being efficient to process, e.g., having lower relative viscosities and/or using lower die pressures.

SUMMARY

According to some embodiments, the present disclosure relates to a nonwoven polyamide composition having permanent antimicrobial properties comprising: a nonwoven polyamide having an average fiber diameter of less than 25 microns; less than 2000 ppm of zinc dispersed within the nonwoven polyamide; and less than 2000 ppm of phosphorus; wherein the weight ratio of the zinc to the phosphorus is: at least 1.3:1; or less than 0.64:1. In some aspects, the weight ratio of the zinc to the phosphorus is at least 2:1. The relative viscosity of the polyamide composition may range from 10 to 100, e.g., from 20 to 100. In some aspects, the polyamide composition may comprise less than 500 ppm of zinc. The polyamide composition may comprise a delusterant including at least a portion of the phosphorus. In some aspects, the polyamide composition comprises no phosphorus. The zinc may be provided via a zinc compound comprising zinc oxide, zinc acetate, zinc ammonium carbonate, zinc ammonium adipate, zinc stearate, zinc phenyl phosphinic acid, zinc pyrithione and/or combinations thereof. In some aspects, the zinc compound does not comprise zinc phenyl phosphinate and/or zinc phenyl phosphonate. In some aspects, the phosphorus is provided via a phosphorus compound comprising phosphoric acid, benzene phosphinic acid, benzene phosphonic acid, manganese hypophosphite, sodium hypophosphite, monosodium phosphate, hypophosphorous acid, phosphorous acid, and/or combinations thereof. In some aspects, the polyamide composition comprises less than 500 ppm of zinc, wherein the polyamide composition comprises a delusterant including at least a portion of the phosphorus, and wherein the polyamide composition demonstrates a *Staphylococcus Aureus* reduction of at least 90%, as measured by ISO 20743-13. In some aspects, the polyamide comprises a nylon, wherein the zinc is provided via zinc oxide and/or zinc pyrithione, and wherein the relative viscosity of the polyamide composition ranges from 10 to 100, e.g., from 20 to 100. In some aspects, the polyamide comprises nylon-6,6, wherein the zinc is provided via zinc oxide, wherein the weight ratio of zinc to phosphorus is at least 2:1, and wherein the polyamide composition demonstrates a *Staphylococcus Aureus* reduction of at least 90%, as measured by ISO 20743-13. The nonwoven may further comprise one or more additional antimicrobial agents comprising silver, tin, copper, and gold, and alloys, oxides, and/or combinations thereof. The melt point of the nonwoven may be 225° C. or greater. The nonwoven polyamide may be formed by melt, solution, centrifugal, or electro-spinning. In some aspects, the average fiber diameter of the nonwoven polyamide is 1000 nanometers or less. In some aspects, no more than 20% of the fibers have a diameter of greater than 700 nanometers. In some aspects, the polyamide comprises nylon 66 or nylon 6/66. In some aspects, the polyamide comprises a high temperature nylon. In some aspects, the polyamide comprises N6, N66, N6T/66, N612, N6/66, N6I/66, N66/6I/6T, N11, and/or N12, wherein "N" means Nylon. In some aspects, the nonwoven polyamide has an Air Permeability Value of less than 600 CFM/ft². In some aspects, the nonwoven polyamide has a basis weight of 200 GSM or less.

In some embodiments, the disclosure relates to nonwoven polyamide, e.g., nylon 66 or nylon 6/66, structure having antimicrobial properties comprising: nonwoven polyamide fibers comprising less than 4000 ppm zinc, e.g., less than 3200 ppm, or less than 3100 ppm, dispersed within the nonwoven polyamide fibers; and less than 2000 ppm phosphorus. The fibers have an average fiber diameter of less than 25 microns, e.g., less than 20 microns. The polyamide structure demonstrates a *Staphylococcus Aureus* reduction of at least 90%, as measured by ISO 20743-13. The weight ratio of the zinc to the phosphorus may be at least 1.3:1; or less than 0.64:1. The relative viscosity of the polyamide composition may be less than 100. The structure and/or the fibers may comprise a delusterant including at least a portion of the phosphorus. The nonwoven polyamide may be melt spun, spunbonded, electrospun, solution spun, or centrifugally spun. In some cases, no more than 20% of the fibers have a diameter of greater than 700 nanometers. The antimicrobial fibers may have a zinc retention greater than 70% as measured by a dye bath test.

In some embodiments, the disclosure relates to a process for preparing an antimicrobial nonwoven polyamide structure having permanent antimicrobial properties, the process comprising: preparing precursor polyamide optionally comprising an aqueous monomer solution; dispersing less than 4000 ppm zinc within the precursor polyamide; dispersing less than 2000 ppm phosphorus within the precursor polyamide; polymerizing the precursor polyamide to form a polyamide composition; spinning the polyamide composition to form antimicrobial polyamide fibers; and forming the antimicrobial polyamide fibers into the antimicrobial nonwoven structure having a fiber diameter of less than 25 microns. The antimicrobial fibers may have a zinc retention greater than 70% as measured by a dye bath test. The weight ratio of the zinc to the phosphorus may be at least 1.3:1; or less than 0.64:1. The polyamide may be melt spun by way of melt blowing through a die into a high velocity gaseous stream. The nonwoven polyamide may be melt spun, spunbonded, electrospun, solution spun, or centrifugally spun. The nonwoven may comprises a nylon 66 polyamide which is melt spun into fibers and formed into said nonwoven, wherein no more than 20% of the fibers have a diameter of greater than 25 microns.

According to some embodiments, the present disclosure relates to antimicrobial fibers having permanent antimicrobial properties comprising: a nonwoven polyamide having an average fiber diameter of less than 25 microns; less than 2000 ppm of zinc dispersed within the nonwoven polyamide; and less than 2000 ppm of phosphorus. In some aspects, the weight ratio of zinc to phosphorus is: at least 1.3:1; or less than 0.64:1. In some aspects, the weight ratio of the zinc to the phosphorus is at least 2:1. In some aspects, the fibers have an average diameter less than 20 microns. The nonwoven polyamide may comprise less than 500 ppm of zinc. The nonwoven polyamide may comprise a delusterant including at least a portion of the phosphorus. The antimicrobial fibers may have a zinc retention greater than 70% as measured by a dye bath test. The zinc may be a zinc compound comprising zinc oxide, zinc acetate, zinc ammonium carbonate, zinc ammonium adipate, zinc stearate, zinc phenyl phosphinic acid, zinc pyrithione and/or combinations thereof. The phosphorus may be a phosphorus compound comprising phosphoric acid, benzene phosphinic acid, benzene phosphonic acid, manganese hypophosphite, sodium hypophosphite, monosodium phosphate, hypophosphorous acid, phosphorous acid, and/or combinations thereof. The nonwoven polyamide may comprise less than 500 ppm of zinc, wherein the polymer comprises a delusterant including at least a portion of the phosphorus, and wherein the antimicrobial fibers demonstrates a *Staphylococcus Aureus* reduction of at least 90%, as measured by ISO 20743-13. The nonwoven polyamide may comprises nylon, wherein the zinc is provided in the form of zinc oxide and/or zinc pyrithione, wherein the relative viscosity of the polymer resin composition ranges from 10 to 100, e.g., from 20 to 100, and wherein the antimicrobial fibers have a zinc retention greater than 80% as measured by a dye bath test, and wherein the fibers have an average diameter less than 18 microns. The nonwoven polyamide may comprise nylon-6, 6, wherein the zinc is provided in the form of zinc oxide, wherein the weight ratio of zinc to phosphorus is at least 2:1, wherein the antimicrobial fibers demonstrate a *Staphylococcus Aureus* reduction of at least 90%, as measured by ISO 20743-13, wherein the antimicrobial fibers have a zinc retention greater than 95% as measured by a dye bath test, and wherein the antimicrobial fibers have an average diameter less than 10 microns. The nonwoven polyamide may further comprise one or more additional antimicrobial agents comprising silver, tin, copper, and gold, and alloys, oxides, and/or combinations thereof. The melt point of the nonwoven may be 225° C. or greater. The nonwoven polyamide may be melt spun, spunbonded, electrospun, solution spun, or centrifugally spun. In some aspects, the average fiber diameter of the nonwoven polyamide may be 1000 nanometers or less. In some aspects, no more than 20% of the fibers have a diameter of greater than 700 nanometers. The polyamide may comprise nylon 66 or nylon 6/66. The polyamide may comprise a high temperature nylon. The polyamide may comprise N6, N66, N6T/66, N612, N6/66, N6I/66, N66/6I/6T, N11, and/or N12, wherein "N" means Nylon. The nonwoven polyamide may have an Air Permeability Value of less than 600 CFM/ft². The nonwoven polyamide may have a basis weight of 200 GSM or less. Basis weight may be determined by ASTM D-3776 and reported in GSM (g/m²).

According to some embodiments, the present disclosure relates to a process for preparing antimicrobial nonwoven polyamides having permanent antimicrobial properties, the process comprising: preparing an aqueous monomer solution for forming a polyamide; adding less than 1000 ppm of zinc dispersed within the aqueous monomer solution; adding less than 2000 ppm of phosphorus; polymerizing the aqueous monomer solution to form the polyamide; spinning the polyamide to form the antimicrobial polyamide fibers; and forming the antimicrobial polyamide fibers into antimicrobial nonwoven polyamides having a fiber diameter of less than 25 microns; wherein the weight ratio of zinc to phosphorus is: at least 1.3:1 or less than 0.64:1. The polyamide may comprise less than 2000 ppm zinc. The antimicrobial fibers may have a zinc retention greater than 70% as measured by a dye bath test. The step of adding phosphorus may comprise adding a delusterant including at least a portion of the phosphorus. The polyamide may be melt spun by way of melt blowing through a die into a high velocity gaseous stream. The polyamide may be melt spun by 2-phase propellant-gas spinning, including extruding the polyamide composition in liquid form with pressurized gas through a fiber-forming channel. The nonwoven may be formed by collecting the fibers on a moving belt. In some aspects, the relative viscosity of the polyamide in the nonwoven may be reduced as compared to the polyamide prior to spinning and forming the nonwoven. In some aspects, the relative viscosity of the polyamide in the nonwoven is the same or increased as compared to the polyamide prior to spinning and forming the nonwoven. The nonwoven may comprise a nylon 66 polyamide which is melt spun and formed into said nonwoven, wherein the nonwoven has a TDI of at least 20 ppm and an ODI of at least 1 ppm. The nonwoven may comprise a nylon 66 polyamide which is melt spun into fibers and formed into said nonwoven, wherein no more than 20% of the fibers have a diameter of greater than 25 microns. In some aspects, the polyamide is melt spun, spunbonded, electrospun, solution spun, or centrifugally spun.

In some embodiments, the disclosure relates to a nonwoven polyamide structure having antimicrobial properties comprising: nonwoven polyamide fibers having an average fiber diameter of less than 25 microns; less than 4000 ppm zinc dispersed within the nonwoven polyamide fibers. The polyamide composition may demonstrate a *Staphylococcus Aureus* reduction of at least 90%, as measured by ISO 20743-13.

In some embodiments, the disclosure relates to a process for preparing an antimicrobial nonwoven polyamide structure having antimicrobial properties, the process comprising: preparing a formulation comprising a polyamide, less than 4000 ppm zinc dispersed within the polyamide; and less than 2000 ppm phosphorus dispersed within the polyamide; spinning the formulation to form antimicrobial polyamide fibers having a fiber diameter of less than 25 microns; and forming the antimicrobial polyamide fibers into antimicrobial nonwoven polyamide structure. The fibers may be spun using a die pressure less than 275 psig.

BRIEF DESCRIPTION OF DRAWINGS

The disclosure is described in detail below with reference to the drawings wherein like numerals designate similar parts and wherein.

DETAILED DESCRIPTION

Introduction

Figure 1:
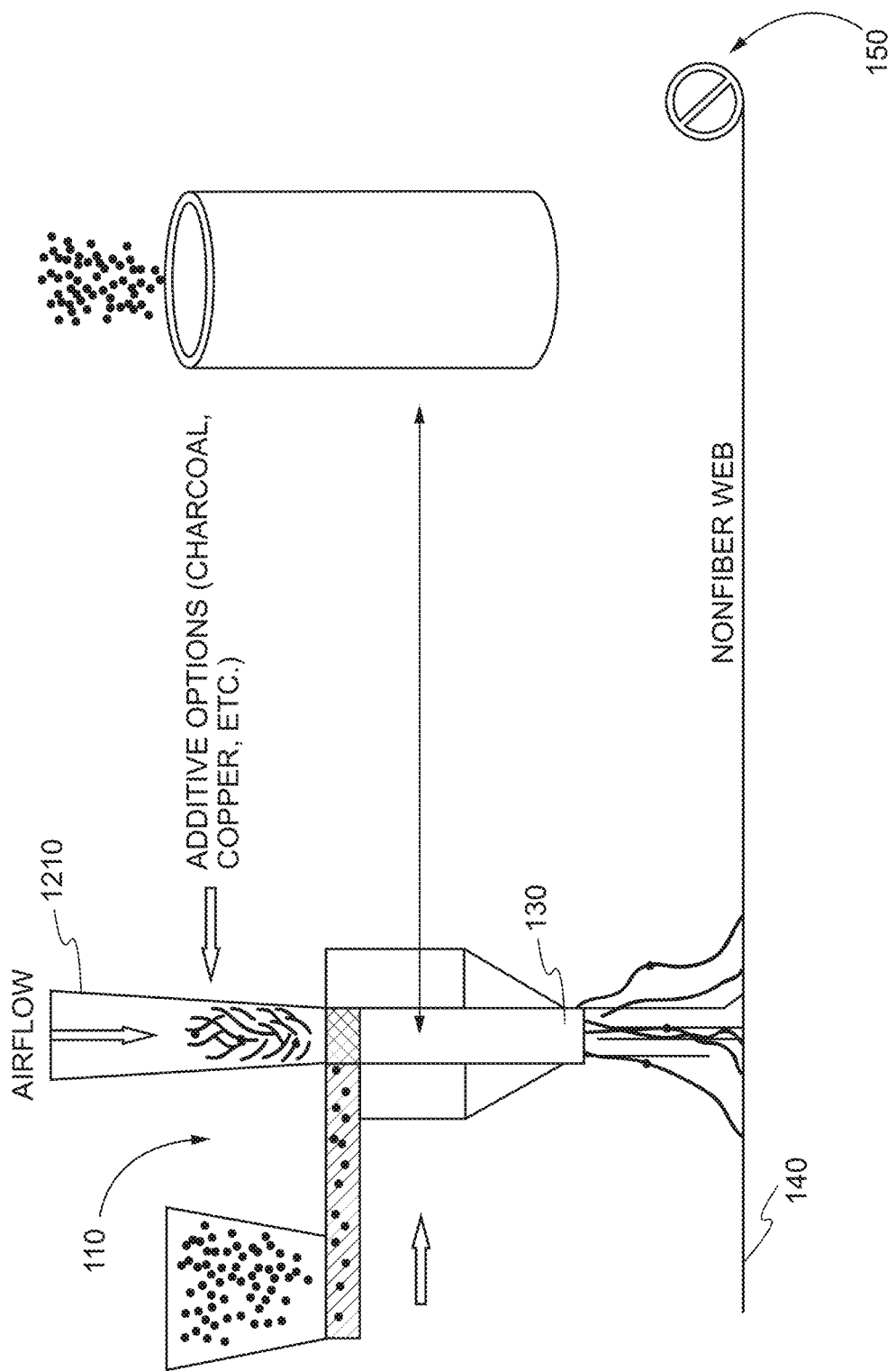
FIG. 1 and FIG. 2 are separate schematic diagrams of a 2-phase propellant-gas spinning system useful in connection with the present disclosure.

As discussed above, some conventional antimicrobial fibers and fabrics utilize antimicrobial compounds to inhibit pathogens. For example, some fabrics may include antimicrobial additives, e.g., silver, applied as a film on an exterior layer via a topical treatment. It has been found, however, that these treatments often (quickly) leach from the fabric. Likewise, in some non-coating applications where the antimicrobial additives are a component of the fiber, the antimicrobial additives have also been known to wash out, usually within about 10 wash-cycles, leaching the additives into the environment.

The disclosed nonwoven fibers and fabrics, however, advantageously eliminate the need for a topical treatment to make apparel antimicrobial. The present antimicrobial fibers and fabrics have "built-in" antimicrobial properties. And these properties beneficially will not wash away after significant washing or wash cycles. Further, the antimicrobial fibers can maintain colorfastness (a characteristic that relates to a material's resistance to color fading or running) and durability. Unlike conventional antimicrobial fabrics, the present fibers and fabrics do not lose their antimicrobial activity from leaching and extraction after repeated use and wash cycles.

Also, the references that relate to carpet fibers relate to higher denier (for example, greater than 12 dpf) and/or higher fiber diameter (for example, greater than 20 microns) fibers/filaments. These carpet fibers are formed via entirely different, non-analogous processes/equipment (filament spinning vs. fiber blowing), which results in entirely different products (a single, longer, thicker filament vs. a plurality of thinner intertwined fibers). In view of these significant differences, the teachings of such carpet fiber references are not typically considered relevant to blowing operations, e.g., nonwovens. More specifically, in carpet fiber production, formulations having different amounts, e.g., higher amounts, of phosphorus compounds (optionally with zinc compounds) are employed for their ability to increase relative viscosity of the polymer.

However, phosphorous compounds are not typically used in non-carpet, e.g., textile, polymer formulations because the use and the accompanying relative viscosity build might contribute to processability issues. Stated another way, the nonwoven equipment and processes cannot process the carpet formulation (with the increased relative viscosity), because it could impede processability and make production difficult if not impossible. In contrast to carpet formulations, the (nonwoven) polyamide compositions disclosed herein comprise a unique combination of zinc and optionally phosphorus, each preferably in particular amount, e.g., lower amounts, that retards or eliminates the viscosity build that is associated with conventional carpet fiber formulations (and also provides additional synergistic benefits). As a result, the nonwoven formulations disclosed herein are surprisingly capable of forming much thinner fibers having antimicrobial properties, e.g., in the form of a nonwoven web, without the aforementioned processing problems. Conventional formulations could not be effectively spun into such thin diameter fibers, e.g., nanofiber nonwoven webs.

Still further, conventional nylon formulations that employ antimicrobial agents may require the use of higher die pressures to form the smaller diameter fibers of nonwoven mats. These higher die pressures often lead to higher detrimental fiber interruptions.

Also, although some references directly mix antimicrobial agents with fibers, leathers, or plastics, such processes did not solve problems of quality deterioration of products since the antimicrobial ability was lost due to heat degradation, loss of colorfastness, or problems due to the elution of antimicrobial substances. Still other conventional antimicrobial fabrics, e.g., nonwoven fabrics, have been found to have insufficient strength for apparel applications, e.g., an inability to withstand significant washing, and are unable to retain antimicrobial properties over the product lifetime.

Further, it has now been discovered that presence of zinc (zinc compounds) and optionally phosphorus, each preferably in specific amounts in a nonwoven polyamide composition, is capable of providing for effective production of antimicrobial nonwoven fibers, e.g., nanofibers, that are able to retain enduring antimicrobial properties. The production of these fibers may be advantageously achieved using lower die pressure operation. In some cases, the compositions have lower relative viscosity (RV), which may contribute to the lower die pressure operation. Without being bound by theory, in some embodiments, the use of the phosphorus compound in the specific amounts may allow the zinc to be more stably disposed in the polymer and/or in the fibers, and, as such, may retard leaching of the zinc from the fibers/fabrics, e.g., during washing. Stated another way, the polyamide composition may have certain amounts of zinc and phosphorus embedded in the polyamide such that they retain permanent antimicrobial properties. Additionally, the use of a nonwoven polyamide as the polymer resin, especially a nonwoven polyamide formed by a melt spinning, solution spinning, centrifugal spinning, or electro-spinning process, has been found to have improved durability. There are numerous additional benefits to using a melt blown or spun nonwoven polyamide, as are described further herein.

It was also beneficially found that providing a zinc compound and optionally a phosphorus compound to the polymer composition during the production process of the fibers, e.g., to the aqueous monomer solution or via masterbatch, produces fibers with antimicrobial agents evenly dispersed throughout the entire fiber. In conventional processes, a silver coating is applied to the outer surface of the fabric to impart antimicrobial properties to the fabric. However, the silver coating is not dispersed throughout the fabric and is more susceptible to leaching components, e.g., silver, into the environment. Advantageously, the present polymer composition does not give rise to toxicity because it does not elute the antimicrobial agents, nor does it include any toxic components, e.g., silver. Additionally, antimicrobial fibers formed the present polymer composition do not require a separate application step since the antimicrobial agents are permanently disposed in the polymer and/or in the fibers.

In other embodiments, the compositions comprise little or no phosphorus. The disclosed zinc compounds, optionally in the disclosed amounts, lend beneficial properties to the antimicrobial polyamide composition and to the processes that employ them, e.g., low die pressure operation.

As noted above, as an additional benefit, the fibers formed using the nonwoven polyamide formulation/composition, have advantageous physical features, e.g., lower average fiber diameter, which allows them to be used in various applications, where higher fiber diameter are unsuitable, e.g., apparel or other next-to-skin applications as well as filtration, where the thicker fibers are unsuitable.

In one aspect, the present disclosure relates to a polyamide formulation/composition, which may in some cases be used to form antimicrobial fibers (nanofibers) optionally arranged to form the polyamide structure. The nonwoven polyamide composition comprises particular antimicrobial agents, which are efficacious and are significantly resistant to washing or wearing from the fiber. Importantly, the formulations provide for processing advantages, for example, the ability to form thinner diameter fibers, the ability to be used in low die pressure operation, and/or the ability have preferred relative viscosity (RV) parameters. In one aspect, the antimicrobial fibers form fabrics or certain portions of fabrics. In some embodiments, the formulations comprise a polyamide or polyamide mixture and a zinc compound. In some cases, the formulations further comprise a phosphorus compound. Details of the components (and the compositional amounts thereof), the items formed therefrom, and the performance characteristics thereof are disclosed herein.

In some embodiments, the disclosure relates to a nonwoven polyamide structure, e.g., a mat, having antimicrobial properties. The structure comprises thin diameter polyamide fibers (in some cases nonwoven fibers), e.g., having an average fiber diameter of less than 25 microns. The fibers comprise zinc compound in specific amounts, and the zinc is dispersed within the fibers (as a component of the fibers/polymer), which is in contrast to conventional fibers or structures that may have an antimicrobial coating on the surfaces thereof.

The structure (and/or the fibers that form the structure) demonstrates improved antimicrobial performance, e.g. the structure demonstrates a *Staphylococcus Aureus* reduction of at least 90%, e.g., at least 99%, or a *Klebsiella pneumonia* reduction of at least 90% growth, e.g., at least 99%, as measured by ISO 20743-13.

Antimicrobial Components

As noted above, the polyamide formulation includes zinc and optionally phosphorus, preferably in specific amounts in the polyamide composition, which provide the aforementioned antimicrobial benefits and/or physical/performance benefits. As used herein, "zinc compound" refers to a compound having at least one zinc molecule or ion. As used herein, "phosphorus compound" refers to a compound having at least one phosphorus molecule or ion.

The polyamide formulation (or the structures or fibers made therefrom) comprises (elemental) zinc, e.g., zinc is dispersed within the polyamide formulation. In some embodiments, the concentration of zinc in the polyamide formulation is in a range from 100 ppb to 4000 ppm, e.g., from 500 ppb to 3500 ppm, from 1 ppm to 3500 ppm, from 200 ppm to 3000 ppm, from 275 ppm to 3100 ppm, from 200 ppm to 1500 ppm, from 100 ppm to 2000 ppm, from 200 ppm to 700 ppm, from 250 ppm to 550 ppm, from 1 ppm to 1000 ppm, e.g., from 25 ppm to 950 ppm, from 50 ppm to 900 ppm, from 100 ppm to 800 ppm, from 150 ppm to 700 ppm, from 175 ppm to 600 ppm, from 200 ppm to 500 ppm, from 215 ppm to 400 ppm, from 225 ppm to 350 ppm, or from 250 ppm to 300 ppm. In terms of lower limits, the polyamide formulation comprises greater than 100 ppb zinc, e.g., greater than 500 ppb, greater than 1 ppm, greater than 5 ppm, greater than 10 ppm, greater than 25 ppm, greater than 50 ppm, greater than 75 ppm, greater than 100 ppm, greater than 150 ppm, greater than 175 ppm, greater than 200 ppm, greater than 215 ppm, greater than 225 ppm, greater than 250 ppm, or greater than 275 ppm. In terms of upper limits, the polyamide formulation comprises less than 4000 ppm zinc, e.g., less than 3500 ppm, less than 3000 ppm, less than 3100 ppm, less than 2000 ppm, less than 1500 ppm zinc, less than 1000 ppm zinc, less than 950 ppm, less than 900 ppm, less than 800 ppm, less than 700 ppm, less than 600 ppm, less than 550 ppm, less than 500 ppm, less than 400 ppm, or less than 300 ppm. In some aspects, zinc is embedded in the polymer formed from the polyamide formulation.

The manner in which the zinc is provided to the polyamide formulation may vary widely. Many techniques for providing zinc in the polyamide formulation are within the contemplation of this disclosure and will be suitable. As one example, the zinc compound may be added as a component of the polyamide. In one embodiment, zinc compounds can be added as a masterbatch. The masterbatch may include a polyamide such as nylon 6 or nylon 6,6. In yet other embodiments, the zinc compound may be added by dusting powder onto the pellets. In yet another embodiment zinc can be added (as a powder) onto the nylon 6,6 pellets and processed through a twin screw extruder to more evenly distribute the material through the polymer, enhancing the uniformity of the additive throughout the fabric. In one embodiment, the zinc compound may added to the salt solution during polyamide formation.

In some embodiments, the formulations, structures, and/or fibers comprise (elemental) phosphorus. Regardless of how the phosphorus is provided (see discussion below), the phosphorus, like the zinc, is present in the polyamide formulation. In some embodiments, the concentration of phosphorus in the polyamide formulation ranges from 10 ppm to 1000 ppm, e.g., from 20 ppm to 950 ppm, from 30 to 900, from 50 ppm to 850 ppm, from 100 ppm 800 ppm, from 150 ppm to 750 ppm, from 200 ppm to 600 ppm, from 250 ppm to 550 ppm, from 300 ppm to 500 ppm, or from 350 ppm to 450 ppm. In terms of upper limits, the concentration of phosphorus in the polyamide formulation may be less than 1000 ppm, e.g., less than 950 ppm, less than 900 ppm, less than 800 ppm, less than 700 ppm, less than 600 ppm, less than 500 ppm, less than 400 ppm, less than 300 ppm, or less than 200 ppm. In terms of lower limits, the concentration of phosphorus in the polyamide formulation may be greater than 10 ppm, e.g., greater than 20 ppm, greater than 40 ppm, greater than 60 ppm, greater than 80 ppm, greater than 100 ppm, greater than 150 ppm, or greater than 180 ppm. In some aspects, phosphorus is embedded in the polymer of the polyamide formulation.

The manner in which the phosphorus is provided to the polyamide formulation may vary widely. Many techniques for providing phosphorus in the polyamide formulation are within the contemplation of this disclosure and will be suitable. As one example, phosphorus or a phosphorus compound may be added as a component of the resin, e.g., in manners similar to those of the zinc.

In one embodiment, the phosphorus may be provided as a component of another additive. For example, the phosphorus may be a component of a delusterant that is added to the polymer composition. Specifically, the phosphorus may be a coating additive/component of the delusterant. In some aspects, the delusterant comprises titanium dioxide. The titanium dioxide may comprise a phosphorus-containing surface coating, e.g., manganese coated titanium dioxide. In some aspects, the phosphorus present in the polyamide composition is entirely supplied by the additive, e.g., delusterant. In some aspects, the phosphorus present in the polyamide composition is partly supplied by the additive and partly as a phosphorus additive.

In some aspects, the phosphorus present in the polyamide formulation is entirely supplied by the delusterant, e.g., titanium dioxide additive, and no phosphorus, e.g., phosphorus additive, is separately added to the polyamide composition. For example, the titanium dioxide additive may be present in the polymer formulation, wherein the titanium dioxide includes less than 2000 ppm phosphorus based on the total weight of the polyamide formulation. In some embodiments, the polyamide formulation may include a titanium dioxide additive and a phosphorus additive, which in conjunction, supply less than 2000 ppm of phosphorus based on the total weight of the polyamide formulation.

In some embodiments, inorganic pigment-like materials can be utilized as delusterants. The delusterants may comprise one or more of titanium dioxide, barium sulfate, barium titanate, zinc titanate, magnesium titanate, calcium titanate, zinc oxide, zinc sulfide, lithopone, zirconium dioxide, calcium sulfate, barium sulfate, aluminum oxide, thorium oxide, magnesium oxide, silicon dioxide, talc, mica, and the like. Colored materials such as carbon black, copper phthalocyanine pigment, lead chromate, iron oxide, chromium oxide, and ultramarine blue may also be used. In some aspects, the delusterants comprise non-phenolic polynuclear compounds such as triphenyl benzene, diphenyl, substituted diphenyls, substituted naphthalenes, and chlorinated compounds of the aromatic and polynuclear type, e.g., chlorinated diphenyl.

The inventors have found that, in some cases, the use of specific weight ratios of zinc to phosphorus minimizes the negative effects of the phosphorus on the polyamide formulation. For example, too much phosphorus in the polyamide composition can lead to polymer drip, increased polymer viscosity, and inefficiencies in production processes.

In one embodiment, the weight ratio of zinc to phosphorus in the polyamide formulation may be greater than 1.3:1, e.g., greater than 1.4:1, greater than 1.5:1, greater than 1.6:1, greater than 1.7:1, greater than 1.8:1, or greater than 2:1. In terms of ranges, the weight ratio of zinc to phosphorus in the polyamide formulation may range from 1.3:1 to 30:1, e.g., from 1.4:1 to 25:1, from 1.5:1 to 20:1, from 1.6:1 to 15:1, from 1.8:1 to 10:1, from 2:1 to 8:1, from 3:1 to 7:1, or from 4:1 to 6:1. In terms of upper limits, the weight ratio of zinc to phosphorus in the polyamide composition may be less than 30:1, e.g., less than 28:1, less than 26:1, less than 24:1, less than 22:1, less than 20:1, or less than 15:1. In some aspects, there is no phosphorus in the polyamide formulation. In other aspects, a very low amount of phosphorus is present. In some cases, phosphorus is held in the fibers/polymer along with zinc.

In one embodiment, the weight ratio of zinc to phosphorus in the polyamide formulation may be less than 0.64:1, e.g., less than 0.62:1, less than 0.6:1, e.g., less than 0.5:1, less than 0.45:1, less than 0.4:1, less than 0.3:1, or less than 0.25:1. In terms of ranges, the weight ratio of zinc to phosphorus in the polyamide formulation may range from 0.001:1 to 0.64:1, e.g., from 0.01:1 to 0.6:1, from 0.05:1 to 0.5:1, from 0.1:1 to 0.45:1, from 0.2:1 to 0.4:1, from 0.25:1 to 0.35:1, or from 0.2:1 to 0.3:1. In terms of lower limits, the weight ratio of zinc to phosphorus in the polyamide formulation may be greater than 0.001:1, e.g., greater than 0.005:1, greater than 0.01:1, greater than 0.05:1, greater than 0.1:1, greater than 0.15:1, or greater than 0.2:1.

In some cases, it has been determined that a specific amount of zinc and phosphorus can be mixed in a polyamide formulation, e.g., polyamide resin composition, in finely divided form, such as in the form of granules, flakes and the like, to provide a polyamide formulation that can be subsequently formed, e.g., extruded or otherwise drawn, into fibers by conventional methods to produce fibers having substantially improved antimicrobial activity. The zinc and phosphorus are employed in the polyamide formulation in the aforementioned amounts to provide a fiber with permanent antimicrobial activity.

As noted herein, by utilizing a polyamide formulation having the aforementioned zinc concentration, phosphorus concentration, and optionally the range of relative viscosity and or other characteristics, the resultant antimicrobial fiber is capable of retaining a higher percentage of zinc. The resulting nonwovens have (permanent or enduring) antimicrobial properties.

In some embodiments, the antimicrobial fibers formed from the polyamide formulation have a zinc retention greater than 70% as measured by the dye bath test, e.g., greater than 75%, greater than 80%, greater than 90%, greater than 95%, or greater than 99%. In terms of upper limits, the antimicrobial fiber has a zinc retention of less than 100%, e.g., less than 99.9%, less than 98%, less than 95% or less than 90%. In terms of ranges, the antimicrobial fiber has a zinc retention in a range from 70% to 100%, e.g., from 75% to 99.9%, from 80% to 99%, or from 90% to 98%.

The zinc retention of fibers formed from the polyamide formulation may be measured by a dye bath test according to the following standard procedure. A sample is cleaned (all oils are removed) by a scour process. The scour process may employ a heated bath, e.g., conducted at 71° C. for 15 minutes. A scouring solution comprising 0.25% on weight of fiber ("owf") of Sterox (723 Soap) nonionic surfactant and 0.25% owf of TSP (trisodium phosphate) may be used. The samples were then rinsed with water and then rinsed with cold water.

The cleaned samples may be tested according to a chemical dye level procedure. This procedure may employ placing them in a dye bath comprising 1.0% owf of C.I. Acid Blue 45, 4.0% owf of MSP (monosodium phosphate), and a sufficient % owf of disodium phosphate or TSP to achieve a pH of 6.0, with a 28:1 liquor to fiber ratio. For example, if a pH of less than 6 is desired, a 10% solution of the desired acid may be added using an eye dropper until the desired pH was achieved. The dye bath may be preset to bring the bath to a boil at 100° C. The samples are placed in the bath for 1.5 hours. As one example, it may take approximately 30 minutes to reach boil and then hold the bath at a boil for one hour. Then the samples are removed from the bath and rinsed. The samples are then transferred to a centrifuge for water extraction. After water extraction, the samples were laid out to air dry. The component amounts before and after the procedure are then measured and recorded.

In some embodiments, the zinc may be provided as a zinc compound. The zinc compound may comprise zinc oxide, zinc acetate, zinc ammonium carbonate, zinc ammonium adipate, zinc stearate, zinc phenyl phosphinic acid, zinc pyrithione and combinations thereof. In some aspects, the zinc is provided in the form of zinc oxide. In some aspects, the zinc is not provided via zinc phenyl phosphinate and/or zinc phenyl phosphonate. Beneficially, the inventors have found that these particular zinc compounds work particularly well because they readily disassociate to form more zinc ions.

In some embodiments, the phosphorus may be provided as a phosphorus compound. In aspects, the phosphorus compound may comprise phenylphosphinic acid, diphenylphosphinic acid, sodium phenylphosphinate, phosphorous acid, benzene phosphonic acid, calcium phenylphosphinate, potassium B-pentylphosphinate, methylphosphinic acid, manganese hypophosphite, sodium hypophosphite, monosodium phosphate, hypophosphorous acid, dimethylphosphinic acid, ethylphosphinic acid, diethylphosphinic acid, magnesium ethylphosphinate, triphenyl phosphite, diphenylmethyl phosphite, dimethylphenyl phosphite, ethyldiphenyl phosphite, phenylphosphonic acid, methylphosphonic acid, ethylphosphonic acid, potassium phenylphosphonate, sodium methylphosphonate, calcium ethylphosphonate, and combinations thereof. In some embodiments, the phosphorus compound may comprise phosphoric acid, benzene phosphinic acid, benzene phosphonic acid, and combinations thereof. The phosphorus or phosphorus compound may also be dispersed in the polymer along with zinc.

In some embodiments, the antimicrobial agent, e.g., zinc, is added with phosphorus to promote the incorporation of the antimicrobial agent into the fibers/polymer of the polyamide composition. This procedure advantageously allows for more uniform dispersion of the antimicrobial agent throughout the eventual fiber. Further, this combination "builds-in" the antimicrobial within the polyamide composition to help prevent or limit the active antimicrobial ingredients from being washed from the fiber.

In some embodiments, the polyamide composition may include additional antimicrobial agents other than zinc. The additional antimicrobial agents may be any suitable antimicrobial, such as silver, copper, and/or gold in metallic forms, e.g., particulates, alloys and oxides, salts, e.g., sulfates, nitrates, acetates, citrates, and chlorides, and/or in ionic forms. In some aspects, further additives, e.g., additional antimicrobial agents, are added to the polyamide composition.

Antimicrobial Performance

In some embodiments, the formulation, structure, and/or fibers demonstrate improved antimicrobial performance, e.g., after 24 hours. For example, the formulation, structure, and/or fibers may demonstrate *Staphylococcus aureus* reduction (inhibition of growth) of at least 90%, as measured by ISO 20743-13, e.g., at least 95%, at least 99%, at least 99.98, at least 99.99, at least 99.997, at least 99.999, or at least 99.9999.

In some embodiments, the formulation, structure, and/or fibers demonstrate improved antimicrobial performance. For example, the formulation, structure, and/or fibers may demonstrate *Klebsiella pneumoniae* reduction (inhibition of growth) of at least 90%, as measured by ISO 20743-13, e.g., at least 95%, at least 99%, at least 99.98, at least 99.99, at least 99.999, at least 99.9998, or at least 99.9999.

In terms of log reduction (*Staphylococcus aureus*), the formulation, structure, and/or fibers may demonstrate a log reduction of greater than 2.0, e.g., greater than 3.0, greater than 3.5, greater than 4.0, greater than 4.5, greater than 4.375, or greater than 5.0.

In terms of log reduction (*Klebsiella pneumoniae*), the formulation, structure, and/or fibers may demonstrate a log reduction of greater than 3.0, e.g., greater than 3.75, greater than 4.0, greater than 4.0, greater than 4.5, greater than 4.75, greater than 5.0, greater than 5.5, or greater than 6.0.

Fiber Dimensions and Distributions

The fibers disclosed herein are microfibers, e.g., fibers having an average fiber diameter of less than 25 microns, or nanofibers, e.g., fibers having an average fiber diameter of less than 1000 nm (1 micron).

In some embodiments, the fibers have an average fiber diameter less than the diameter of fibers formed for carpet-related applications, which are generally unsuitable for next-to-skin applications, For example the fibers may have an average fiber diameter less than 25 microns, e.g., less than 20 microns, less than 18 microns, less than 17 microns, less than 15 microns, less than 12 microns, less than 10 microns, less than 7 microns, less than 5 microns, less than 3 microns, or less than 2 microns.

In some cases, the average fiber diameter of the nanofibers in the (fiber layer of the) nonwoven may be less than 1 micron, e.g., less than 950 nanometers, less than 925 nanometers, less than 900 nanometers, less than 800 nanometers, less than 700 nanometers, less than 600 nanometers, or less than 500 nanometers. In terms of lower limits, the average fiber diameter of the nanofibers may be at least 100 nanometers, at least 110 nanometers, at least 115 nanometers, at least 120 nanometers, at least 125 nanometers, at least 130 nanometers, or at least 150 nanometers. In terms of ranges, the average fiber diameter of the nanofibers may be from 100 to 1000 nanometers, e.g., from 110 to 950 nanometers, from 115 to 925 nanometers, from 120 to 900 nanometers, from 125 to 800 nanometers, from 125 to 700 nanometers, from 130 to 600 nanometers, or from 150 to 500 nanometers. Such average fiber diameters may differentiate the nanofibers formed by the spinning methods disclosed herein from nanofibers formed by electrospinning methods. Electrospinning methods typically have average fiber diameters of less than 100 nanometers, e.g., from 50 up to less than 100 nanometers. Without being bound by theory, it is believed that such small nanofiber diameters may result in reduced strength of the fibers and increased difficulty in handling the nanofibers. Although some electrospinning methods may be contemplated.

In some cases, the average fiber diameter of the microfibers in nonwoven may be less than 25 microns, e.g., less than 24 microns, less than 22 microns, less than 20 microns, less than 15 microns, less than 10 microns, or less than 5 microns. In terms of lower limits, the average fiber diameter of the microfibers in the nonwoven may be at least 1 micron, at least 2 microns, at least 3 microns, at least 5 microns, at least 7 microns, or at least 10 microns. In terms of ranges, the average fiber diameter of the nanofibers in the fiber layer of the nonwoven may be from 1 to 25 microns, e.g., from 2 to 24 microns, from 3 to 22 microns, from 5 to 20 microns, from 7 to 15 microns, from 2 to 10 microns, or from 1 to 5 microns. Such average fiber diameters differentiate the microfibers formed by the spinning methods disclosed herein from fibers formed by electrospinning methods.

The use of the disclosed methods and formulations leads to a specific and beneficial distribution of fiber diameters. For example, in the case of nanofibers, less than 20% of the nanofibers may have a fiber diameter from greater than 700 nanometers, e.g., less than 17.5%, less than 15%, less than 12.5%, or less than 10%. In terms of lower limits, at least 1% of the nanofibers have a fiber diameter of greater than 700 nanometers, e.g., at least 2%, at least 3%, at least 4%, or at least 5%. In terms of ranges, from 1 to 20% of the nanofibers have a fiber diameter of greater than 700 nanometers, e.g., from 2 to 17.5%, from 3 to 15%, from 4 to 12.5%, or from 5 to 10%. Such a distribution may differentiate the nanofiber nonwoven products described herein from those formed by electrospinning (which have a smaller average diameter (50-100 nanometers) and a much narrower distribution) and from those formed by non-nanofiber melt spinning (which have a much greater distribution). For example, a non-nanofiber centrifugally spun nonwoven is disclosed in WO 2017/214085 and reports fiber diameters of 2.08 to 4.4 microns but with a very broad distribution reported in FIG. 10A of WO 2017/214085. Electrospinning, however, may still be used, depending on the desired fiber diameter and distribution.

In the case of microfibers, the fiber diameter may also have a desirably narrow distribution depending on the size of the microfiber. For example, less than 20% of the microfibers may have a fiber diameter greater than 2 microns greater than the average fiber diameter, e.g., less than 17.5%, less than 15%, less than 12.5%, or less than 10%. In terms of lower limits, at least 1% of the microfibers have a fiber diameter of greater than 2 microns greater than the average fiber diameter, e.g., at least 2%, at least 3%, at least 4%, or at least 5%. In terms of ranges, from 1 to 20% of the microfibers have a fiber diameter of greater than 2 microns greater than the average fiber diameter, e.g., from 2 to 17.5%, from 3 to 15%, from 4 to 12.5%, or from 5 to 10%. In further examples, the above recited distributions may be within 1.5 microns of the average fiber diameter, e.g., within 1.25 microns, within 1 micron, or within 500 nanometers.

In some aspects, combinations of fibers having different average fiber diameters may be used. For example, a combination of nanofibers and microfibers may be used, e.g., a combination of fibers having an average fiber diameter of less than 1 micron and fibers having an average fiber diameter from 1 to 25 microns. In further aspects, combinations of nanofibers having different average fiber diameters may be used. In still further aspects, combinations of microfibers having different fiber diameters may be used. In yet further aspects, combinations of three, four, five, or more fibers having different fiber diameters may be used.

In an embodiment, advantages are envisioned having two related polymers with different RV values (both less than 330 and having an average fiber diameter less than 1 micron) blended for a desired property. For example, the melting point of the polyamide may be increased, the RV adjusted, or other properties adjusted.

In an embodiment, advantages are envisioned having two related polymers with different RV values (both less than 330 and having an average fiber diameter as discussed herein) blended for a desired property. For example, the melting point of the polyamide may be increased, the RV adjusted, or other properties adjusted.

The antimicrobial fibers and fabrics advantageously have durable antimicrobial properties. In some aspects, the antimicrobial fibers may be formed from polyamides, polyesters, and blends thereof. The antimicrobial fibers may be spun to form a nonwoven that imparts the advantageous antimicrobial properties to textiles, e.g., apparel such as athletic wear or other next-to-skin apparel.

In some embodiments, the polyamide composition is used to produce antimicrobial molded and processed products having permanent antimicrobial properties. In some aspects, a molded and processed product comprising the antimicrobial polyamide composition is produced. In some aspects, the polyamide composition can further comprise additives such as, for example, EBS and polyethylene wax, which are two non-limiting examples of additives.

In some embodiments, the polyamide composition can be utilized in injection molding, extrusion molding, blowing, or laminating treatment methods after their direct addition during the molding process of plastics. In other embodiments, the polyamide composition can be added to form a master batch that is used to form a molded product.

Some embodiments relate to a molded and processed product comprising the polyamide composition. In some aspects, the molded and processed products are industrial supplies, various wrappers, consumer supplies or medical supplies, and the molded and processed products can be applied to interior materials such as blinds, wall papers and floor coverings; food related products such as films for wrapping, storage containers, and cutting boards; appliances such as humidifiers, washers, and dish washers; engineering materials such as water supply and drain pipes, and concrete; core materials in medical fields; and products for industrial purposes such as coatings. The molded and processed products are particularly useful for medical supplies, that is, medical devices/products for insertion into the human body such as catheters for medical purposes, prostheses, and products for repairing bones, or blood transfusion bags for medical purposes.

RV of Polyamide, Formulation, Structure, and Fibers

RV of polyamides and formulations (and resultant structures and products) is generally a ratio of solution or solvent viscosities measured in a capillary viscometer at 25° C. (ASTM D 789) (2015). For present purposes the solvent is formic acid containing 10% by weight water and 90% by weight formic acid. The solution is 8.4% by weight polymer dissolved in the solvent.

The RV ($\eta_r$) as used with respect to the disclosed polymers and products is the ratio of the absolute viscosity of the polymer solution to that of the formic acid:

$$\eta_r = (\eta_p/\eta_f) = (f_r \times d_p \times t_p)/\eta f$$

where: $d_p$=density of formic acid-polymer solution at 25° C., $t_p$=average efflux time for formic acid-polymer solution, $\eta_f$=absolute viscosity of formic acid, kPa×s(E+6 cP) and $f_r$=viscometer tube factor, mm$^2$/s (cSt)/s=$\eta_r/t_3$.

A typical calculation for a 50 RV specimen:

$$\eta r = (fr \times dp \times tp)/\eta f$$

where:
fr=viscometer tube factor, typically 0.485675 cSt/s
dp=density of the polymer—formic solution, typically 1.1900 g/ml
tp=average efflux time for polymer—formic solution, typically 135.00 s
$\eta$f=absolute viscosity of formic acid, typically 1.56 cP
giving an RV of $\eta$r=(0.485675 cSt/s×1.1900 g/ml×135.00 s)/1.56 cP=50.0. The term $t_3$ is the efflux time of the S-3 calibration oil used in the determination of the absolute viscosity of the formic acid as required in ASTM D789 (2015).

Advantageously, it has been discovered that adding the above identified proportions of zinc and optionally phosphorus may result in a beneficial relative viscosity of the polyamide formulation, structure, and/or fibers. In some embodiments, the RV ranges from 1 to 100, e.g., from 10 to 100, from 20 to 100, from 25 to 80, from 30 to 60, from 40 to 50, from 1 to 40, from 10 to 30, from 15 to 20, from 20 to 35, or from 25 to 32. In terms of lower limits, the RV may be greater than 1, e.g., greater than 10, greater than 15, greater than 20, greater than 25, greater than 30, greater than 35, or greater than 40. In terms of upper limits, the RV may be less than 100, e.g., less than 80, less than 60, less than 40, less than 35, less than 32, less than 30, or less than 20.

In some embodiments, the RV of the (precursor) polyamide has a lower limit of at least 2, e.g., at least 3, at least 4, or at least 5. In terms of upper limits, the polyamide has an RV of at 330 or less, 300 or less, 275 or less, 250 or less, 225 or less, 200 or less, 150 or less, 100 or less, or 60 or less. In terms of ranges, the polyamide may have an RV of 2 to 330, e.g., from 2 to 300, from 2 to 275, from 2 to 250, from 2 to 225, from 2 to 200, 2 to 100, from 2 to 60, from 2 to 50, from 2 to 40, from 10 to 40, or from 15 to 40 and any values in between.

In some embodiments, the RV of the nonwoven structure has a lower limit of at least 2, e.g., at least 3, at least 4, or at least 5. In terms of upper limits, the nanofiber nonwoven product has an RV of at 330 or less, 300 or less, 275 or less, 250 or less, 225 or less, 200 or less, 150 or less, 100 or less, or 60 or less. In terms of ranges, the nonwoven may have an RV of 2 to 330, e.g., from 2 to 300, from 2 to 275, from 2 to 250, from 2 to 225, from 2 to 200, 2 to 100, from 2 to 60, from 2 to 50, from 2 to 40, from 10 to 40, or from 15 to 40, and any values in between.

The relationship between the RV of the (precursor) polyamide composition and the RV of the nonwoven structure or the fibers thereof may vary. In some aspects, the RV of the nonwoven may be lower than the RV of the polyamide composition. Reducing the RV conventionally has not been a desirable practice when spinning nylon 66. The inventors, however, have discovered that, in the production of microfibers and nanofibers, it is an advantage. It has been found that the use of lower RV polyamide nylons, e.g., lower RV nylon 66, in a melt spinning method has surprisingly been found to yield microfiber and nanofiber filaments having unexpectedly small filament diameters.

The method by which the RV is lowered may vary widely. In some cases, method temperature may be raised to lower the RV. In some embodiments, however, the temperature raise may only slightly lower the RV since temperature affects the kinetics of the reaction, but not the reaction equilibrium constant. The inventors have discovered that, beneficially, the RV of the polyamide, e.g., the nylon 66, may be lowered by depolymerizing the polymer with the addition of moisture. Up to 5% moisture, e.g., up to 4%, up to 3%, up to 2%, or up to 1%, may be included before the polyamide begins to hydrolyze. This technique provides a surprising advantage over the conventional method of adding other polymers, e.g., polypropylene, to the polyamide (to reduce RV).

In some aspects, the RV may be adjusted, e.g., by lowering the temperature, manipulating the zinc amount, and/or by reducing the moisture. Again, temperature has a relatively modest effect on adjusting the RV, as compared to moisture content. The moisture content may be reduced to as low as 1 ppm or greater, e.g., 5 ppm or greater, 10 ppm or greater, 100 ppm or greater, 500 ppm or greater, 1000 ppm or greater, or 2500 ppm or greater. Reduction of moisture content is also advantageous for decreasing TDI and ODI values, discussed further herein. Inclusion of a catalyst may affect the kinetics, but not the actual equilibrium constant.

In some aspects, the RV of the nonwoven is at least 20% less than the RV of the polyamide prior to spinning, e.g., at least 25% less, at least 30% less, at least 35% less, at least 40% less, at least 45% less, or at least 90% less.

In other aspects, the RV of the nonwoven is at least 5% greater than the RV of the polyamide prior to spinning, e.g., at least 10% greater, at least 15% greater, at least 20% greater, at least 25% greater, at least 30% greater, or at least 35% greater.

In still further aspects, the RV of the polyamide and the RV of the nonwoven may be substantially the same, e.g., within 5% of each other.

An additional embodiment of the present disclosure involves production of an antimicrobial structure comprising polyamide nanofibers and/or microfibers having an average fiber diameter of less than 25 microns, and having an RV of from 2 to 330. In this alternate embodiment, preferable RV ranges include: 2 to 330, e.g., from 2 to 300, from 2 to 275, from 2 to 250, from 2 to 225, from 2 to 200, 2 to 100, from 2 to 60, from 2 to 50, from 2 to 40, from 10 to 40, or from 15 to 40. The nanofibers and/or microfibers are subsequently converted to nonwoven web. As the RV increases beyond about 10 to 30, e.g., 20 to 30, operating temperature becomes a greater parameter to consider. At an RV above the range of about 10 to 30, e.g., 20 to 30, the temperature must be carefully controlled so as the polymer melts for processing purposes. Methods or examples of melt techniques are described in U.S. Pat. No. 8,777,599 (incorporated by reference herein), as well as heating and cooling sources which may be used in the apparatuses to independently control the temperature of the fiber producing device. Non limiting examples include resistance heaters, radiant heaters, cold gas or heated gas (air or nitrogen), or conductive, convective, or radiation heat transfer mechanisms.

Nonwoven Polyamide Characteristics

The spinning processes described herein can form an antimicrobial nonwoven polyamide structure (and fibers) having a relatively low oxidative degradation index ("ODI") value. A lower ODI indicates less severe oxidative degradation during manufacture. In some aspects, the ODI may range from 10 to 150 ppm. ODI may be measured using gel permeation chromatography (GPC) with a fluorescence detector. The instrument is calibrated with a quinine external standard. 0.1 grams of nylon is dissolved in 10 mL of 90% formic acid. The solution is then analyzed by GPC with the fluorescence detector. The detector wavelengths for ODI are 340 nm for excitation and 415 nm for emission. In terms of upper limits, the ODI of the antimicrobial nonwoven polyamide may be 200 ppm or less, e.g., 180 ppm or less, 150 ppm or less, 125 ppm or less, 100 ppm or less, 75 ppm or less, 60 ppm or less, or 50 ppm or less. In terms of the lower limits, the ODI of the antimicrobial nonwoven polyamide may be 1 ppm or greater, 5 ppm or greater, 10 ppm or greater, 15 ppm or greater, 20 ppm or greater, or 25 ppm or greater. In terms of ranges, the ODI of the antimicrobial nonwoven polyamide may be from 1 to 200 ppm, from 1 to 180 ppm, from 1 to 150 ppm, from 5 to 125 ppm, from 10 to 100 ppm, from 1 to 75 ppm, from 5 to 60 ppm, or from 5 to 50 ppm.

Additionally, the spinning processes as described herein can result in a relatively low thermal degradation index ("TDI"). A lower TDI indicates a less severe thermal history of the polyamide during manufacture. TDI is measured the same as ODI, except that the detector wavelengths for TDI are 300 nm for excitation and 338 nm for emission. In terms of upper limits, the TDI of the polyamide nanofiber nonwoven may be 4000 ppm or less, e.g., 3500 ppm or less, 3100 ppm or less, 2500 ppm or less, 2000 ppm or less, 1000 ppm or less, 750 ppm or less, or 700 ppm or less. In terms of the lower limits, the TDI of the polyamide nanofiber nonwoven may be 20 ppm or greater, 100 ppm or greater, 125 ppm or greater, 150 ppm or greater, 175 ppm or greater, 200 ppm or greater, or 210 ppm or greater. In terms of ranges, the TDI of the polyamide nanofiber nonwoven may be from 20 to 400 ppm, 100 to 4000 ppm, from 125 to 3500 ppm, from 150 to 3100 ppm, from 175 to 2500 ppm, from 200 to 2000 ppm, from 210 to 1000 ppm, from 200 to 750 ppm, or from 200 to 700 ppm.

TDI and ODI test methods are also disclosed in U.S. Pat. No. 5,411,710. Lower TDI and/or ODI values are beneficial because they indicate that the antimicrobial nonwoven polyamide is more durable than products having greater TDI and/or ODI. As explained above, TDI and ODI are measures of degradation and a product with greater degradation would not perform as well. For example, such a product may have erratic dye uptake, lower heat stability, lower life in a filtration application where the fibers are exposed to heat, pressure, oxygen, or any combination of these, and lower tenacity in industrial fiber applications.

One possible method that may be used in forming an antimicrobial nonwoven polyamide with a lower TDI and/or ODI would be to include additives as described herein, especially antioxidants. Such antioxidants, although not necessary in conventional processes, may be used to inhibit degradation. An example of useful antioxidants include copper halides and Nylostab® S-EED® available from Clariant.

The spinning methods as described herein may also result in an antimicrobial nonwoven polyamide structure (or fibers) having an Air Permeability Value of less than 600 CFM/ft$^2$, e.g., less than 590 CFM/ft$^2$, less than 580 CFM/ft$^2$, less than 570 CFM/ft$^2$, less than 560 CFM/ft$^2$, or less than 550 CFM/ft$^2$. In terms of lower limits, the antimicrobial nonwoven polyamide may have an Air Permeability Value of at least 50 CFM/ft$^2$, at least 75 CFM/ft$^2$, at least 100 CFM/ft$^2$, at least 125 CFM/ft$^2$, at least 150 CFM/ft$^2$, or at least 200 CFM/ft$^2$. In terms of ranges, the antimicrobial nonwoven polyamide may have an Air Permeability Value from 50 to 600 CFM/ft$^2$, from 75 to 590 CFM/ft$^2$, from 100 to 580 CFM/ft$^2$, from 125 to 570 CFM/ft$^2$, from 150 to 560 CFM/ft$^2$, or from 200 to 550 CFM/ft$^2$.

The spinning methods as described herein may also result in an antimicrobial nonwoven polyamide having a filtration efficiency, as measured by a TSI 3160 automated filter tester from 1 to 99.999%, e.g., from 1 to 95%, from 1 to 90%, from 1.5 to 85%, or from 2 to 80%. The TSI 3160 Automated Filter Tester is used to test the efficiency of filter materials. Particle penetration and pressure drop are the two important parameters measured using this instrument. Efficiency is 100%-penetration. A challenge solution with known particle size is used. The TSI 3160 is used to measure Hepa filters and uses a DOP solution. It combines an Electrostatic Classifier with dual Condensation Particle Counters (CPCs) to measure most penetrating particle size (MPPS) from 15 to 800 nm using monodisperse particles. And can test efficiencies up to 99.999999%.

Formulations

In one embodiment, the formulation, structure, and/or fibers comprise less than 3100 ppm of zinc and a delusterant including at least a portion of the phosphorus and may demonstrate a *Staphylococcus Aureus* reduction of at least 95%, as measured by ISO 20743-13.

In one embodiment, the formulation, structure, and/or fibers comprise from 275 ppm to 3100 ppm of zinc and little or no phosphorus and nylon-6,6, as the polyamide, may have an average fiber diameter of less than 1 micron; may demonstrate a *Staphylococcus Aureus* reduction of at least 95%, and may demonstrate a *Klebsiella pneumonia* reduction of at least 99%, as measured by ISO 20743-13.

In one embodiment, the formulation, structure, and/or fibers comprise less than 3100 ppm of zinc and little or no phosphorus and nylon-6,6, as the polyamide, may have an average fiber diameter of less than 1 micron; may demonstrate a *Staphylococcus Aureus* reduction of at least 95%, and may demonstrate a *Klebsiella pneumonia* reduction of at least 99%, as measured by ISO 20743-13.

In one embodiment, the formulation, structure, and/or fibers comprise from 200 to 1500 ppm of zinc (optionally provided as zinc oxide and/or zinc stearate) and little or no phosphorus, may have an RV ranging from 10 to 30, may have an average fiber diameter of less than 1 micron; may demonstrate a *Staphylococcus Aureus* reduction of at least 99%, and may demonstrate a *Klebsiella pneumonia* reduction of at least 99.9%, as measured by ISO 20743-13.

In another embodiment, the polymer comprises a nylon-based polymer, the zinc is provided via zinc oxide and/or zinc pyrithione, and the relative viscosity of the polyamide composition ranges from 10 to 100, e.g., 20 to 100.

In yet another embodiment, the polymer comprises nylon-6,6, the zinc is provided via zinc oxide, the weight ratio of zinc to phosphorus is at least 2:1, and the polyamide composition may demonstrate a *Staphylococcus Aureus* reduction of at least 95%, as measured by ISO 20743-13.

In one embodiment, the antimicrobial fibers comprise the polymer comprising less than 500 ppm of zinc, a delusterant including at least a portion of the phosphorus, and the antimicrobial fibers demonstrate a *Staphylococcus Aureus* reduction of at least 90%.

In another embodiment, the antimicrobial fibers comprise the polymer comprising nylon, the zinc is provided in the form of zinc oxide and/or zinc pyrithione, the relative viscosity of the polyamide composition ranges from 10 to 100, e.g., 20 to 100, and the fibers have a zinc retention greater than 80% as measured by a dye bath test, and the fibers have an average diameter less than 18 microns.

In yet another embodiment, the antimicrobial fibers comprise the polymer comprising nylon-6,6, the zinc is provided in the form of zinc oxide, the weight ratio of zinc to phosphorus is at least 2:1, the fibers may demonstrate a *Staphylococcus Aureus* reduction of at least 95%, as measured by ISO 20743-13, the fibers have a zinc retention greater than 90% as measured by a dye bath test, and the antimicrobial fibers have an average diameter less than 10 microns.

Method of Forming Fibers, Nonwoven Structure

As described herein, the antimicrobial nonwoven polyamide structure is formed by spinning the formulation to form the fibers, which are arranged to form the structure.

In some embodiments, the present disclosure provides a process for imparting permanent antimicrobial properties to nonwoven fibers and structures and fabrics made from the polyamide formulations described herein. In some aspects, the fibers, e.g., polyamide fibers, are made by spinning a polyamide formed in a melt polymerization process. During the melt polymerization process of the polyamide composition, an aqueous monomer solution, e.g., salt solution, is heated under controlled conditions of temperature, time and pressure to evaporate water and effect polymerization of the monomers, resulting in a polymer melt. During the melt polymerization process, sufficient amounts of zinc and, optionally, phosphorus, are employed in the aqueous monomer solution to form the polyamide mixture before polymerization. The monomers are selected based on the desired polyamide composition. After zinc and phosphorus are present in the aqueous monomer solution, the polyamide composition may be polymerized. The polymerized polyamide can subsequently be spun into fibers, e.g., by melt, solution, centrifugal, or electro-spinning.

In some embodiments, the process for preparing antimicrobial fibers having permanent antimicrobial properties from the polyamide composition includes preparing an aqueous monomer solution, adding less than 2000 ppm zinc dispersed within the aqueous monomer solution, e.g., less than 1500 ppm, less than 1000 ppm, less than 750 ppm, less than 500 ppm, or less than 400 ppm, and adding less than 2000 ppm phosphorus, e.g., less than 1500 ppm, less than 1000 ppm, less than 750 ppm, less than 500 ppm, or less than 400 ppm, polymerizing the aqueous monomer solution to form a polymer melt, and spinning the polymer melt to form an antimicrobial fiber. In this embodiment, the polyamide composition comprises the resultant aqueous monomer solution after zinc and phosphorus are added.

In some embodiments, the process includes preparing an aqueous monomer solution. The aqueous monomer solution may comprise amide monomers. In some embodiments, the concentration of monomers in the aqueous monomer solution is less than 60 wt %, e.g., less than 58 wt %, less than 56.5 wt %, less than 55 wt %, less than 50 wt %, less than 45 wt %, less than 40 wt %, less than 35 wt %, or less than 30 wt %. In some embodiments, the concentration of monomers in the aqueous monomer solution is greater than 20 wt %, e.g., greater than 25 wt %, greater than 30 wt %, greater than 35 wt %, greater than 40 wt %, greater than 45 wt %, greater than 50 wt %, greater than 55 wt %, or greater than 58 wt %. In some embodiments, the concentration of monomers in the aqueous monomer solution is in a range from 20 wt % to 60 wt %, e.g., from 25 wt % to 58 wt %, from 30 wt % to 56.5 wt %, from 35 wt % to 55 wt %, from 40 wt % to 50 wt %, or from 45 wt % to 55 wt %. The balance of the aqueous monomer solution may comprise water and/or additional additives. In some embodiments, the monomers comprise amide monomers including a diacid and a diamine, i.e., nylon salt.

In some embodiments, the aqueous monomer solution is a nylon salt solution. The nylon salt solution may be formed by mixing a diamine and a diacid with water. For example, water, diamine, and dicarboxylic acid monomer are mixed to form a salt solution, e.g., mixing adipic acid and hexamethylene diamine with water. In some embodiments, the diacid may be a dicarboxylic acid and may be selected from the group consisting of oxalic acid, malonic acid, succinic acid, glutaric acid, pimelic acid, adipic acid, suberic acid, azelaic acid, sebacic acid, undecanedioic acid, dodecandioic acid, maleic acid, glutaconic acid, traumatic acid, and muconic acid, 1,2- or 1,3-cyclohexane dicarboxylic acids, 1,2- or 1,3-phenyl enediacetic acids, 1,2- or 1,3-cyclohexane diacetic acids, isophthalic acid, terephthalic acid, 4,4'-oxybisbenzoic acid, 4,4-benzophenone dicarboxylic acid, 2,6-napthalene dicarboxylic acid, p-t-butyl isophthalic acid and 2,5-furandicarboxylic acid, and mixtures thereof. In some embodiments, the diamine may be selected from the group consisting of ethanol diamine, trimethylene diamine, putrescine, cadaverine, hexamethyelene diamine, 2-methyl pentamethylene diamine, heptamethylene diamine, 2-methyl hexamethylene diamine, 3-methyl hexamethylene diamine, 2,2-dimethyl pentamethylene diamine, octamethylene diamine, 2,5-dimethyl hexamethylene diamine, nonamethylene diamine, 2,2,4- and 2,4,4-trimethyl hexamethylene diamines, decamethylene diamine, 5-methylnonane diamine, isophorone diamine, undecamethylene diamine, dodecamethylene diamine, 2,2,7,7-tetramethyl octamethylene diamine, bis(p-aminocyclohexyl)methane, bis(aminomethyl)norbornane, C2-C16 aliphatic diamine optionally substituted with one or more C1 to C4 alkyl groups, aliphatic polyether diamines and furanic diamines, such as 2,5-bis (aminomethyl)furan, and mixtures thereof. In preferred embodiments, the diacid is adipic acid and the diamine is hexamethylene diamine which are polymerized to form nylon 6,6.

It should be understood that the concept of producing a polyamide from diamines and diacids also encompasses the concept of other suitable monomers, such as, aminoacids or lactams. Without limiting the scope, examples of aminoacids can include 6-aminohaxanoic acid, 7-aminoheptanoic acid, 11-aminoundecanoic acid, 12-aminododecanoic acid, or combinations thereof. Without limiting the scope of the disclosure, examples of lactams can include caprolactam, enantholactam, lauryllactam, or combinations thereof. Suitable feeds for the disclosed process can include mixtures of diamines, diacids, aminoacids and lactams.

After the aqueous monomer solution is prepared, zinc is added to the aqueous monomer solution to form the polyamide composition. In some embodiments, less than 2000 ppm of zinc is dispersed within the aqueous monomer solution. In some aspects, further additives, e.g., additional antimicrobial agents, are added to the aqueous monomer solution. Optionally, phosphorus is added to the aqueous monomer solution.

In some cases, the polyamide composition is polymerized using a conventional melt polymerization process. In one aspect, the aqueous monomer solution is heated under controlled conditions of time, temperature, and pressure to evaporate water, effect polymerization of the monomers and provide a polymer melt. In some aspects, the particular weight ratio of zinc to phosphorus may advantageously promote binding of zinc within the polymer, reduce thermal degradation of the polymer, and enhance its dyeability.

In some aspects, an antimicrobial nylon is prepared by a conventional melt polymerization of a nylon salt. Typically, the nylon salt solution is heated under pressure (e.g. 250 psig/$1825 \times 10^3$ n/m$^2$) to a temperature of, for example, about 245° C. Then the water vapor is exhausted off by reducing the pressure to atmospheric pressure while increasing the temperature to, for example, about 270° C. Before polymerization, zinc and, optionally, phosphorus be added to the nylon salt solution. The resulting molten nylon is held at this temperature for a period of time to bring it to equilibrium prior to being extruded into a fiber. In some aspects, the process may be carried out in a batch or continuous process.

In some embodiments, during melt polymerization, zinc, e.g., zinc oxide is added to the aqueous monomer solution. The antimicrobial fiber may comprise a polyamide that is made in a melt polymerization process and not in a master batch process. In some aspects, the resulting fiber has permanent antimicrobial properties. The resulting fiber can be used for applications such as, e.g., socks, heavy hosiery, and shoes.

The antimicrobial agent may be added to the polyamide during melt polymerization, for example as a master batch or as a powder added to the polyamide pellets, and thereafter, the fiber may be formed from spinning. The fibers are then formed into a nonwoven In some aspects, the antimicrobial nonwoven structure is melt blown. Melt blowing is advantageously less expensive than electrospinning. Melt blowing is a process type developed for the formation of microfibers and nonwoven webs. Until recently, microfibers have been produced by melt blowing. Now, nanofibers may also be formed by melt blowing. The nanofibers are formed by extruding a molten thermoplastic polymeric material, or polyamide, through a plurality of small holes. The resulting molten threads or filaments pass into converging high velocity gas streams which attenuate or draw the filaments of molten polyamide to reduce their diameters. Thereafter, the melt blown nanofibers are carried by the high velocity gas stream and deposited on a collecting surface, or forming wire, to form a nonwoven web of randomly disbursed melt blown nanofibers. The formation of nanofibers and nonwoven webs by melt blowing is well known in the art. See, by way of example, U.S. Pat. Nos. 3,704,198; 3,755,527; 3,849,241; 3,978,185; 4,100,324; and 4,663,220.

One option, "Island-in-the-sea," refers to fibers forming by extruding at least two polymer components from one spinning die, also referred to as conjugate spinning.

As is well known, electrospinning has many fabrication parameters that may limit spinning certain materials. These parameters include: electrical charge of the spinning material and the spinning material solution; solution delivery (often a stream of material ejected from a syringe); charge at the jet; electrical discharge of the fibrous membrane at the collector; external forces from the electrical field on the spinning jet; density of expelled jet; and (high) voltage of the electrodes and geometry of the collector. In contrast, the aforementioned nanofibers and products are advantageously formed without the use of an applied electrical field as the primary expulsion force, as is required in an electrospinning process. Thus, the polyamide is not electrically charged, nor are any components of the spinning process. Importantly, the dangerous high voltage necessary in electrospinning processes, is not required with the presently disclosed processes/products. In some embodiments, the process is a non-electrospin process and resultant product is a non-electrospun product that is produced via a non-electrospin process.

An embodiment of making the inventive nanofiber nonwovens is by way of 2-phase spinning or melt blowing with propellant gas through a spinning channel as is described generally in U.S. Pat. No. 8,668,854. This process includes two phase flow of polymer or polymer solution and a pressurized propellant gas (typically air) to a thin, preferably converging channel. The channel is usually and preferably annular in configuration. It is believed that the polymer is sheared by gas flow within the thin, preferably converging channel, creating polymeric film layers on both sides of the channel. These polymeric film layers are further sheared into nanofibers by the propellant gas flow. Here again, a moving collector belt may be used and the basis weight of the nanofiber nonwoven is controlled by regulating the speed of the belt. The distance of the collector may also be used to control fineness of the nanofiber nonwoven. The process is better understood with reference to FIG. 1.

Beneficially, the use of the aforementioned polyamide precursor in the melt spinning process provides for significant benefits in production rate, e.g., at least 5% greater, at least 10% greater, at least 20% greater, at least 30% greater, at least 40% greater. The improvements may be observed as an improvement in area per hour versus a conventional process, e.g., another process that does not employ the features described herein. In some cases, the production increase over a consistent period of time is improved. For example, over a given time period, e.g., one hour, of production, the disclosed process produces at least 5% more product than a conventional process or an electrospin process, e.g., at least 10% more, at least 20% more, at least 30% more, or at least 40% more.

FIG. 1 illustrates schematically operation of a system for spinning a nanofiber nonwoven including a polyamide feed assembly 110, an air feed 1210 a spinning cylinder 130, a collector belt 140 and a take up reel 150. During operation, polyamide melt or solution is fed to spinning cylinder 130 where it flows through a thin channel in the cylinder with high pressure air, shearing the polyamide into nanofibers. Details are provided in the aforementioned U.S. Pat. No. 8,668,854. The throughput rate and basis weight is controlled by the speed of a gear pump and the speed of the belt. Optionally, functional additives such as charcoals, copper or the like can be added with the air feed, if so desired.

In an alternate construction of the spinneret used in the system of FIG. 1, particulate material may be added with a separate inlet as is seen in U.S. Pat. No. 8,808,594.

Figure 2:
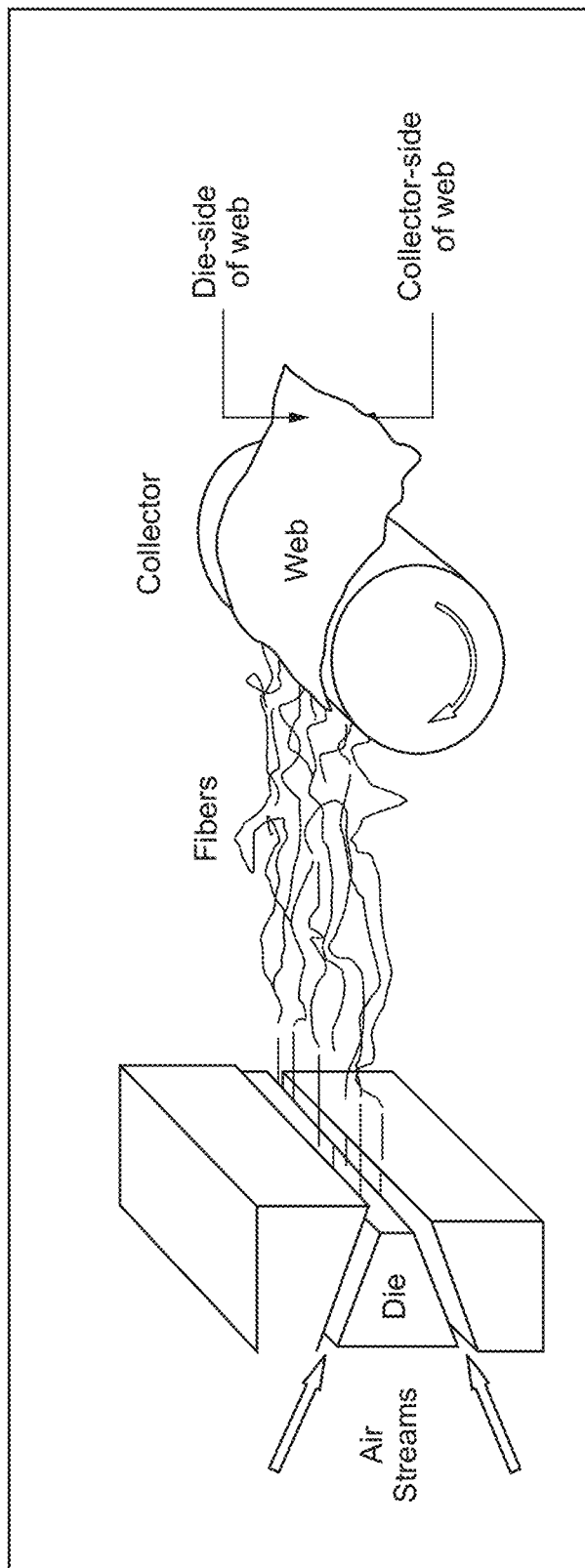
Figure 3:
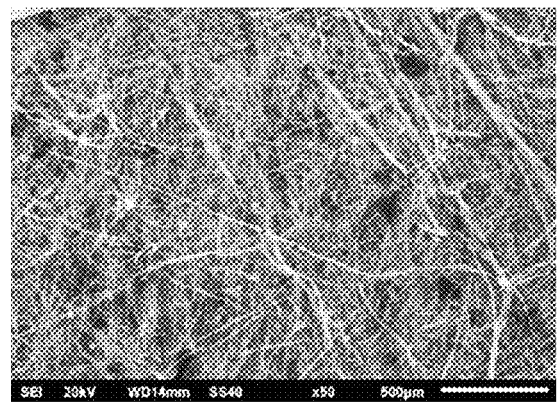
FIG. 3 is a photomicrograph of a nanofiber nylon 66 melt spun into a nonwoven having an RV of 7.3 at a magnification of 50×.
Figure 4:
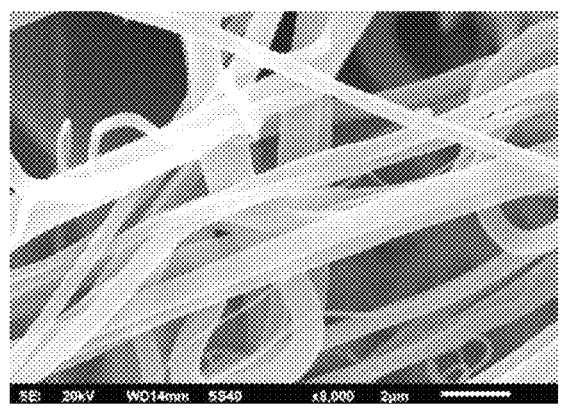
FIG. 4 is a photomicrograph of a nanofiber of a grade from FIG. 3 of nylon 66 melt spun into a nonwoven having an RV of 7.3 at a magnification of 8000×.
Figure 5:
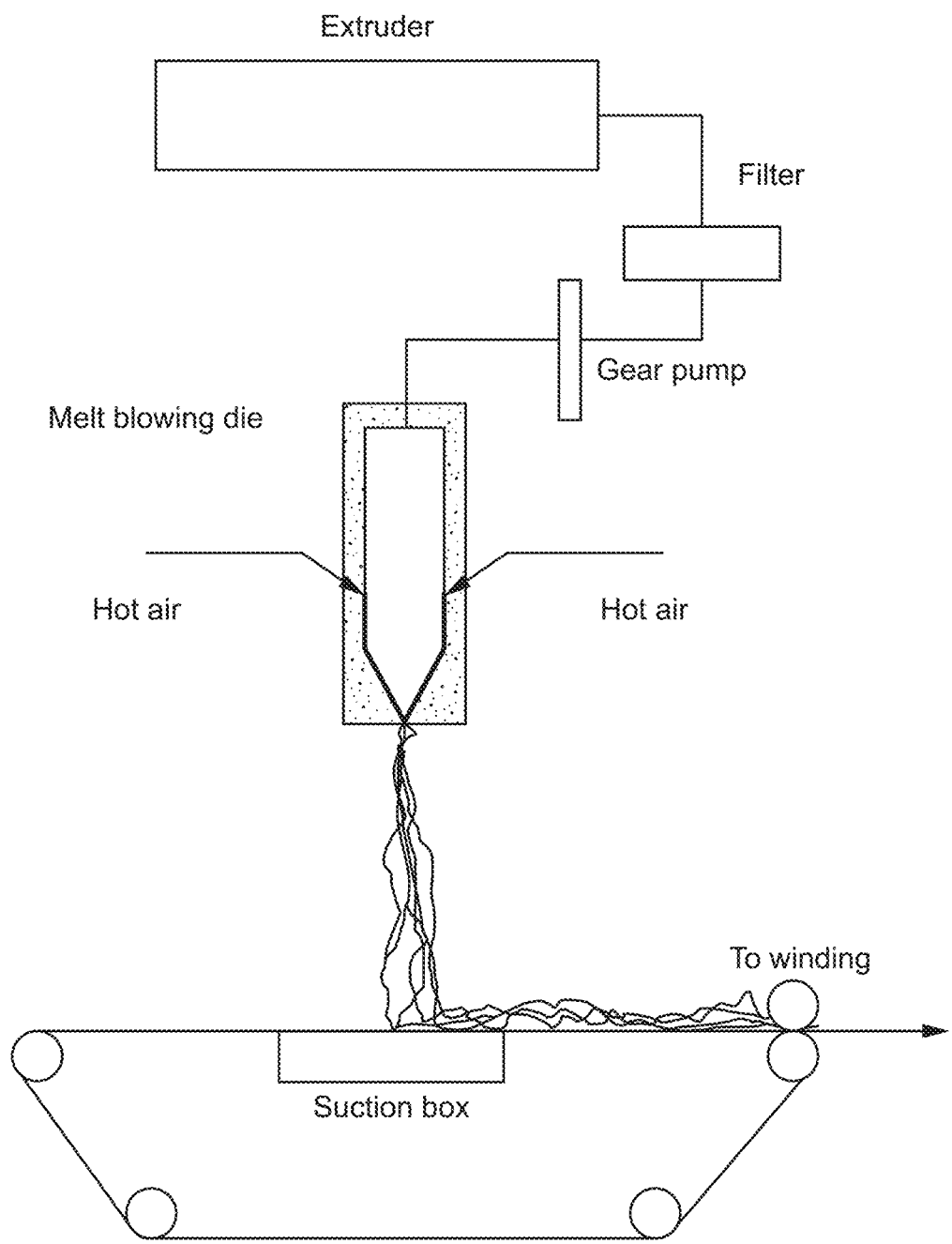
FIG. 5 is a schematic diagram of a melt blowing method in connection with embodiments of the present disclosure.
Figure 6:
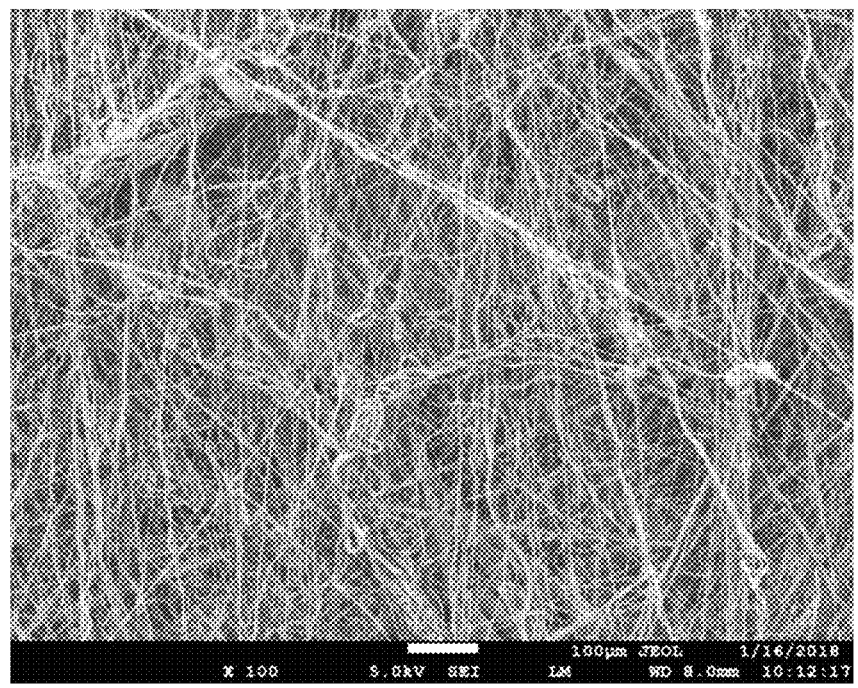
FIG. 6 is a photomicrograph of a nanofiber of nylon 66 with an RV of 36 at a magnification of 100×.
Figure 7:
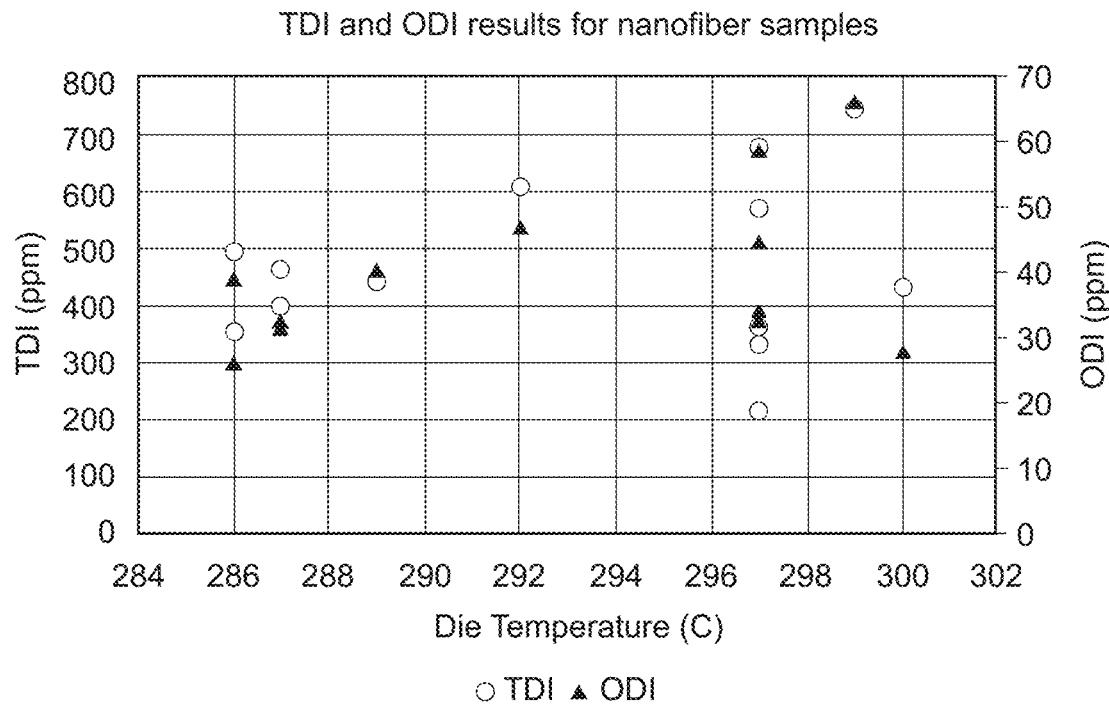
FIG. 7 is a graph comparing thermal degradation index and oxidative degradation index values for nanofiber samples as a function of die temperature.
Figure 8:
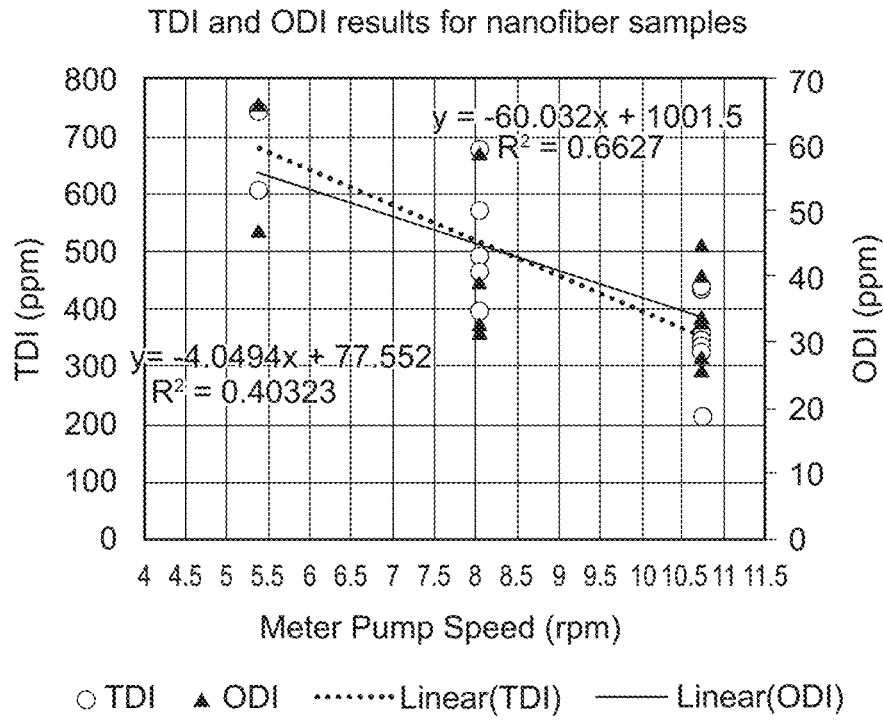
FIG. 8 is a graph comparing thermal degradation index and oxidative degradation index values for nanofiber samples as a function of meter pump speed.

Still yet another methodology which may be employed is melt blowing the polyamide nanofiber webs disclosed herein (FIG. 2). Melt blowing involves extruding the polyamide into a relatively high velocity, typically hot, gas stream. To produce suitable nanofibers, careful selection of the orifice and capillary geometry as well as the temperature is required as is seen in: Hassan et al., J Membrane Sci., 427, 336-344, 2013 and Ellison et al., Polymer, 48 (11), 3306-3316, 2007, and, International Nonwoven Journal, Summer 2003, pg 21-28.

U.S. Pat. No. 7,300,272 discloses a fiber extrusion pack for extruding molten material to form an array of nanofibers that includes a number of split distribution plates arranged in a stack such that each split distribution plate forms a layer within the fiber extrusion pack, and features on the split distribution plates form a distribution network that delivers the molten material to orifices in the fiber extrusion pack. Each of the split distribution plates includes a set of plate segments with a gap disposed between adjacent plate segments. Adjacent edges of the plate segments are shaped to form reservoirs along the gap, and sealing plugs are disposed in the reservoirs to prevent the molten material from leaking from the gaps. The sealing plugs can be formed by the molten material that leaks into the gap and collects and solidifies in the reservoirs or by placing a plugging material in the reservoirs at pack assembly. This pack can be used to make nanofibers with a melt blowing system described in the patents previously mentioned.

In one embodiment, a process for preparing the antimicrobial nonwoven polyamide structure is disclosed. The process comprising the step of forming a (precursor) polyamide (preparation of monomer solutions are well known), e.g., by preparing an aqueous monomer solution. During preparation of the precursor zinc is added (as discussed herein). In some cases, the zinc is added to (and dispersed in) the aqueous monomer solution.

Phosphorus may also be added. In some cases, the precursor is polymerized to form a polyamide composition. The process further comprises the steps of spinning the polyamide to form antimicrobial polyamide fibers and forming the antimicrobial polyamide fibers into antimicrobial nonwoven structure. In some cases, the polyamide composition is melt spun, spunbonded, electrospun, solution spun, or centrifugally spun.

Beneficially, the spinning may take place at low die pressures, which have been found to decrease or eliminate detrimental fiber formation interruptions, which create defects in the web structure. In some embodiments, the spinning may be conducted at a die pressure less than 300 psig, e.g., less than 275 psig, less than 272 psig, less than 250 psig, less than 240 psig, less than 200 psig, less than 190 psig, less than 175 psig, less than 160 psig, or less than 155 psig. In terms of ranges, the spinning may be conducted at a die pressure ranging from 10 psig to 300 psig, e.g., from 25 psig to 275 psig, from 35 psig to 272 psig, from 50 psig to 250 psig, from 75 psig to 240 psig, from 75 psig to 200 psig, or from 90 psig to 155 psig.

In some embodiments, there is disclosed a process for preparing antimicrobial nonwoven fibers, optionally in a structure as discussed above. The process comprises the step of preparing a formulation comprising a polyamide, zinc dispersed within the polyamide; and less than 2000 ppm phosphorus dispersed within the polyamide. The process comprises the step of spinning the formulation to form antimicrobial polyamide fibers, which have the composition and characteristics described herein. The process further comprises the step of forming the antimicrobial polyamide fibers into antimicrobial nonwoven polyamide structure. The spinning is conducted at the low die pressures discussed above.

A fabric can be made from the nonwoven fibers. Garments made from these fabrics can withstand normal wear, and are devoid of any coated, doped, or topical treatment, which tend to abrade off during knitting and weaving. The abrasion process results in dust on machines and fabric, and lowers the effective use time of garments in normal wear and laundering.

Polyamide

As described herein, an antimicrobial polyamide composition is used as the polymer for the nonwoven. As used herein, "polyamide composition" and like terminology refers to compositions containing polyamides including copolymers, terpolymers, polymer blends, alloys and derivatives of polyamides. Further, as used herein, a "polyamide" refers to a polymer, having as a component, a polymer with the linkage of an amino group of one molecule and a carboxylic acid group of another molecule. In some aspects, the polyamide is the component present in the greatest amount. For example, a polyamide containing 40 wt. % nylon 6, 30 wt. % polyethylene, and 30 wt. % polypropylene is referred to herein as a polyamide since the nylon 6 component is present in the greatest amount. Additionally, a polyamide containing 20 wt. % nylon 6, 20 wt. % nylon 66, 30 wt. % polyethylene, and 30 wt. % polypropylene is also referred to herein as a polyamide since the nylon 6 and nylon 66 components, in total are the components present in the greatest amount.

Exemplary polyamides and polyamide compositions are described in Kirk-Othmer, Encyclopedia of Chemical Technology, Vol. 18, pp. 328-371 (Wiley 1982), the disclosure of which is incorporated by reference.

Briefly, polyamides are generally known as compounds that contain recurring amide groups as integral parts of the main polymer chains. Linear polyamides are of particular interest and may be formed from condensation of bifunctional monomers. Polyamides are frequently referred to as nylons. Although they generally are considered as condensation polymers, polyamides may also be formed by ring opening polymerization. This method of preparation is especially important for some polymers in which the monomers are cyclic lactams, e.g., Nylon 6. Particular polymers and copolymers and their preparation are seen in the following patents: U.S. Pat. Nos. 4,760,129; 5,504,185; 5,543,495; 5,698,658; 6,011,134; 6,136,947; 6,169,162; 7,138,482; 7,381,788; and 8,759,475.

There are numerous advantages of using polyamides in commercial applications. Nylons are generally chemical and temperature resistant, resulting in superior performance to other polymers. They are also known to have improved strength, elongation, and abrasion resistance as compared to other polymers. Nylons are also very versatile, allowing for their use in a variety of applications.

A class of polyamides particularly preferred for some applications includes High Temperature Nylons (HTN's) as are described in Glasscock et al., High Performance Polyamides Fulfill Demanding Requirements for Automotive Thermal Management Components, (DuPont), http://www2.dupont.com/Automotive/en_US/assets/downloads/knowledge%20center/HTN-whitepaper-R8.pdf available online Jun. 10, 2016. Such polyamides typically include one or more of the structures seen in the following:

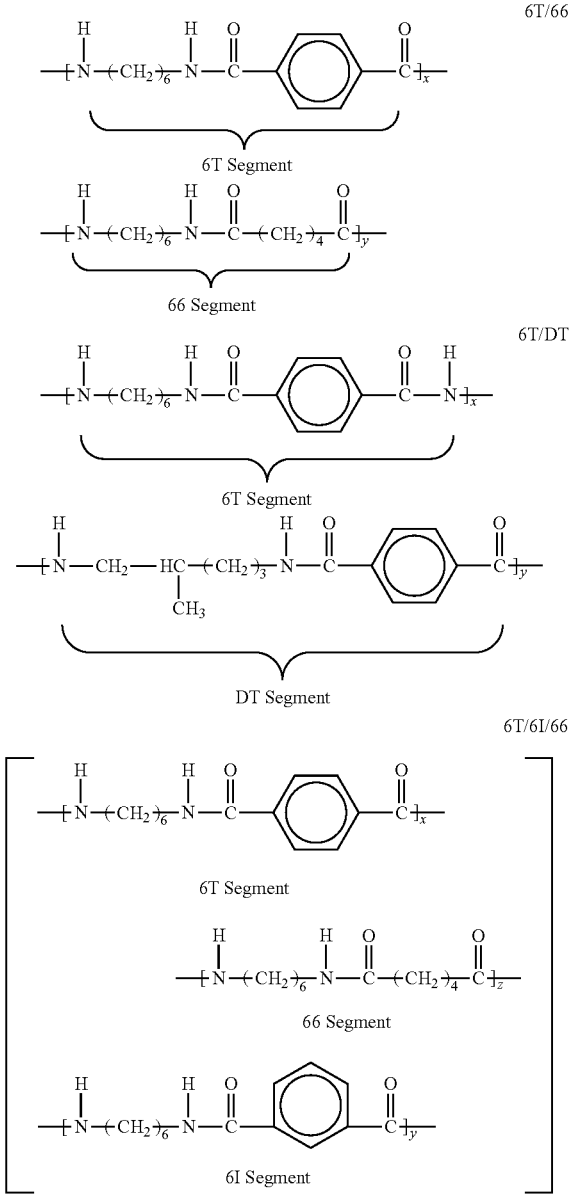

Non-limiting examples of polymers included in the polyamides include polyamides with combinations of other polymers such as polypropylene and copolymers, polyethylene and copolymers, polyesters, polystyrenes, polyurethanes, and combinations thereof. Thermoplastic polymers and biodegradable polymers are also suitable for melt blowing or melt spinning into nanofibers of the present disclosure. As discussed herein, the polymers may be melt spun or melt blown, with a preference for melt spinning or melt blowing by 2-phase propellant-gas spinning, including extruding the polyamide composition in liquid form with pressurized gas through a fiber-forming channel. Other processes to form nonwoven structures may also be used, including spunbonding, solution spinning, and centrifugal spinning.

Melt points of nylon nanofiber products described herein, including copolymers and terpolymers, may be between 223° C. and 390° C., e.g., from 223 to 380, or from 225° C. to 350° C. Additionally, the melt point may be greater than that of conventional nylon 66 melt points depending on any additional polymer materials that are added.

Other polymer materials that can be used in the antimicrobial nanofiber nonwovens of the disclosure include both addition polymer and condensation polymer materials such as polyolefin, polyacetal, polyamide (as previously discussed), polyester, cellulose ether and ester, polyalkylene sulfide, polyarylene oxide, polysulfone, modified polysulfone polymers and mixtures thereof. Preferred materials that fall within these generic classes include polyamides, polyethylene, polyethylene terephthalate (PET), polybutylene terephthalate (PBT), polytrimethylene terephthalate (PTT), polypropylene, poly(vinylchloride), polymethylmethacrylate (and other acrylic resins), polystyrene, and copolymers thereof (including ABA type block copolymers), poly(vinylidene fluoride), poly(vinylidene chloride), polyvinylalcohol in various degrees of hydrolysis (87% to 99.5%) in crosslinked and non-crosslinked forms. Addition polymers tend to be glassy (a Tg greater than room temperature). This is the case for polyvinylchloride and polymethylmethacrylate, polystyrene polymer compositions or alloys or low in crystallinity for polyvinylidene fluoride and polyvinylalcohol materials. Nylon copolymers embodied herein, can be made by combining various diamine compounds, various diacid compounds and various cyclic lactam structures in a reaction mixture and then forming the nylon with randomly positioned monomeric materials in a polyamide structure. For example, a nylon 66-6,10 material is a nylon manufactured from hexamethylene diamine and a C6 and a C10 blend of diacids. A nylon 6-66-6,10 is a nylon manufactured by copolymerization of epsilonaminocaproic acid, hexamethylene diamine and a blend of a C6 and a C10 diacid material.

In some embodiments, such as that described in U.S. Pat. No. 5,913,993, a small amount of polyethylene polymer can be blended with a nylon compound used to form a nanofiber nonwoven fabric with desirable characteristics. The addition of polyethylene to nylon enhances specific properties such as softness. The use of polyethylene also lowers cost of production, and eases further downstream processing such as bonding to other fabrics or itself. The improved fabric can be made by adding a small amount of polyethylene to the nylon feed material used in producing a nanofiber melt blown fabric. More specifically, the fabric can be produced by forming a blend of polyethylene and nylon 66, extruding the blend in the form of a plurality of continuous filaments, directing the filaments through a die to melt blow the filaments, depositing the filaments onto a collection surface such that a web is formed.

The polyethylene useful in the process of this embodiment of the subject disclosure preferably may have a melt index between about 5 grams/10 min and about 200 grams/10 min and, e.g., between about 17 grams/10 min and about 150 grams/10 min. The polyethylene should preferably have a density between about 0.85 grams/cc and about 1.1 grams/cc and, e.g., between about 0.93 grams/cc and about 0.95 grams/cc. Most preferably, the melt index of the polyethylene is about 150 and the density is about 0.93.

The polyethylene used in the process of this embodiment of the subject disclosure can be added at a concentration of about 0.05% to about 20%. In a preferred embodiment, the concentration of polyethylene will be between about 0.1% and about 1.2%. Most preferably, the polyethylene will be present at about 0.5%. The concentration of polyethylene in the fabric produced according to the method described will be approximately equal to the percentage of polyethylene added during the manufacturing process. Thus, the percentage of polyethylene in the fabrics of this embodiment of the subject disclosure will typically range from about 0.05% to about 20% and will preferably be about 0.5%. Therefore, the fabric will typically comprise between about 80 and about 99.95 percent by weight of nylon. The filament extrusion step can be carried out between about 250° C. and about 325° C. Preferably, the temperature range is about 280° C. to about 315° C. but may be lower if nylon 6 is used.

The blend or copolymer of polyethylene and nylon can be formed in any suitable manner. Typically, the nylon compound will be nylon 66; however, other polyamides of the nylon family can be used. Also, mixtures of nylons can be used. In one specific example, polyethylene is blended with a mixture of nylon 6 and nylon 66. The polyethylene and nylon polymers are typically supplied in the form of pellets, chips, flakes, and the like. The desired amount of the polyethylene pellets or chips can be blended with the nylon pellets or chips in a suitable mixing device such as a rotary drum tumbler or the like, and the resulting blend can be introduced into the feed hopper of the conventional extruder or the melt blowing line. The blend or copolymer can also be produced by introducing the appropriate mixture into a continuous polymerization spinning system.

Further, differing species of a general polymeric genus can be blended. For example, a high molecular weight styrene material can be blended with a low molecular weight, high impact polystyrene. A Nylon-6 material can be blended with a nylon copolymer such as a Nylon-6; 66; 6,10 copolymer. Further, a polyvinylalcohol having a low degree of hydrolysis such as a 87% hydrolyzed polyvinylalcohol can be blended with a fully or superhydrolyzed polyvinylalcohol having a degree of hydrolysis between 98 and 99.9% and higher. All of these materials in admixture can be crosslinked using appropriate crosslinking mechanisms. Nylons can be crosslinked using crosslinking agents that are reactive with the nitrogen atom in the amide linkage. Polyvinyl alcohol materials can be crosslinked using hydroxyl reactive materials such as monoaldehydes, such as formaldehyde, ureas, melamine-formaldehyde resin and its analogues, boric acids and other inorganic compounds, dialdehydes, diacids, urethanes, epoxies and other known crosslinking agents. Crosslinking technology is a well-known and understood phenomenon in which a crosslinking reagent reacts and forms covalent bonds between polymer chains to substantially improve molecular weight, chemical resistance, overall strength and resistance to mechanical degradation.

One preferred mode is a polyamide comprising a first polymer and a second, but different polymer (differing in polymer type, molecular weight or physical property) that is conditioned or treated at elevated temperature. The polymer blend can be reacted and formed into a single chemical specie. Preferred materials are chemically reacted into a single polymeric specie such that a Differential Scanning calorimeter (DSC) analysis reveals a single polymeric material to yield improved stability when contacted with high temperature, high humidity and difficult operating conditions. Preferred materials for use in the blended polymeric systems include nylon 6; nylon 66; nylon 6,10; nylon (6-66-6,10) copolymers and other linear generally aliphatic nylon compositions.

A suitable polyamide may include for example, 20% nylon 6, 60% nylon 66 and 20% by weight of a polyester. The polyamide may include combinations of miscible polymers or combinations of immiscible polymers.

In some aspects, the polyamide may include nylon 6. In terms of lower limits, the polyamide may include nylon 6 in an amount of at least 0.1 wt. %, e.g., at least 1 wt. %, at least 5 wt. %, at least 10 wt. %, at least 15 wt. %, or at least 20 wt. %. In terms of upper limits, the polyamide may include nylon 6 in an amount of 99.9 wt. % or less, 99 wt. % or less, 95 wt. % or less, 90 wt. % or less, 85 wt. % or less, or 80 wt. % or less. In terms of ranges, the polyamide may comprise nylon 6 in an amount from 0.1 to 99.9 wt. %, e.g., from 1 to 99 wt. %, from 5 to 95 wt. %, from 10 to 90 wt. %, from 15 to 85 wt. %, or from 20 to 80 wt. %.

In some aspects, the polyamide may include nylon 66. In terms of lower limits, the polyamide may include nylon 66 in an amount of at least 0.1 wt. %, e.g., at least 1 wt. %, at least 5 wt. %, at least 10 wt. %, at least 15 wt. %, or at least 20 wt. %. In terms of upper limits, the polyamide may include nylon 66 in an amount of 99.9 wt. % or less, 99 wt. % or less, 95 wt. % or less, 90 wt. % or less, 85 wt. % or less, or 80 wt. % or less. In terms of ranges, the polyamide may comprise nylon 66 in an amount from 0.1 to 99.9 wt. %, e.g., from 1 to 99 wt. %, from 5 to 95 wt. %, from 10 to 90 wt. %, from 15 to 85 wt. %, or from 20 to 80 wt. %.

In some aspects, the polyamide may include nylon 6I, wherein I means isophthalic acid. In terms of lower limits, the polyamide may include nylon 6I in an amount of at least 0.1 wt. %, e.g., at least 0.5 wt. %, at least 1 wt. %, at least 5 wt. %, at least 7.5 wt. %, or at least 10 wt. %. In terms of upper limits, the polyamide may include nylon 6I in an amount of 50 wt. % or less, 40 wt. % or less, 35 wt. % or less, 30 wt. % or less, 25 wt. % or less, or 20 wt. % or less. In terms of ranges, the polyamide may comprise nylon 6I in an amount from 0.1 to 50 wt. %, e.g., from 0.5 to 40 wt. %, from 1 to 35 wt. %, from 5 to 30 wt. %, from 7.5 to 25 wt. %, or from 10 to 20 wt. %.

In some aspects, the polyamide may include nylon 6T, wherein T means terephthalic acid. In terms of lower limits, the polyamide may include nylon 6T in an amount of at least 0.1 wt. %, e.g., at least 1 wt. %, at least 5 wt. %, at least 10 wt. %, at least 15 wt. %, or at least 20 wt. %. In terms of upper limits, the polyamide may include nylon 6T in an amount of 50 wt. % or less, 47.5 wt. % or less, 45 wt. % or less, 42.5 wt. % or less, 40 wt. % or less, or 37.5 wt. % or less. In terms of ranges, the polyamide may comprise nylon 6T in an amount from 0.1 to 50 wt. %, e.g., from 1 to 47.5 wt. %, from 5 to 45 wt. %, from 10 to 42.5 wt. %, from 15 to 40 wt. %, or from 20 to 37.5 wt. %.

Block copolymers are also useful in the process of this disclosure. With such copolymers the choice of solvent swelling agent is important. The selected solvent is such that both blocks were soluble in the solvent. One example is an ABA (styrene-EP-styrene) or AB (styrene-EP) polymer in methylene chloride solvent. If one component is not soluble in the solvent, it will form a gel. Examples of such block copolymers are Kraton® type of styrene-b-butadiene and styrene-b-hydrogenated butadiene (ethylene propylene), Pebax® type of e-caprolactam-b-ethylene oxide, Sympatex® polyester-b-ethylene oxide and polyurethanes of ethylene oxide and isocyanates.

Addition polymers like polyvinylidene fluoride, syndiotactic polystyrene, copolymer of vinylidene fluoride and hexafluoropropylene, polyvinyl alcohol, polyvinyl acetate, amorphous addition polymers, such as poly(acrylonitrile) and its copolymers with acrylic acid and methacrylates, polystyrene, poly(vinyl chloride) and its various copolymers, poly(methyl methacrylate) and its various copolymers, are known to be solution spun with relative ease because they are soluble at low pressures and temperatures.

It is envisioned these can be melt spun per the instant disclosure as one method of making nanofibers.

There is a substantial advantage to forming polymeric compositions comprising two or more polymeric materials in polymer admixture, alloy format or in a crosslinked chemically bonded structure. We believe such polymer compositions improve physical properties by changing polymer attributes such as improving polymer chain flexibility or chain mobility, increasing overall molecular weight and providing reinforcement through the formation of networks of polymeric materials.

In one embodiment of this concept, two related polymer materials can be blended for beneficial properties. For example, a high molecular weight polyvinylchloride can be blended with a low molecular weight polyvinylchloride. Similarly, a high molecular weight nylon material can be blended with a low molecular weight nylon material.

It has surprisingly been found that these polyamides, when utilized with the aforementioned zinc and/or phosphorus additives and formed into fabrics, may provide odor control features. In some cases, it has been found that conventional polymer resins that utilize polyester polymer resins harbor and allow to flourish different types of bacteria, as compared to those of nylon. For example, *micrococcus* bacteria have been found to flourish in polyester-based fabrics. Thus, the use of polyamide-based polymers, specifically nylon-based polymers, along with the aforementioned additives, surprisingly has been found to yield fabrics that demonstrate significantly low odor levels as compared to similar fabrics that utilize polyesters.

EXAMPLES

Examples 1-6 and Comparative Examples A-E

Precursor polyamide compositions were prepared using the components listed in Table 1a. For zinc oxide samples, a masterbatch of zinc oxide in nylon 6 was blended with nylon 6,6 flake to achieve the desired zinc amount. For zinc stearate samples, the zinc stearate was added as a powder onto the nylon 6,6 flake and processed through a twin screw extruder to achieve the desired zinc amount and to distribute the material through the polymer. For copper acetate samples, copper acetate was added to the salt solution so as to achieve the copper amount.

TABLE 1a

Precursor Compositions

| Sample | Zn compound | Zn amount, ppm | RV |
|---|---|---|---|
| A | — | 0 | n/a |
| B | — | 11 | 24.2 |
| C | — | Trace* | 30.2 |
| D | — | 0 | n/a |
| E | Cu acetate | 60 | n/a |
| 1 | Zn Oxide | 291 | 19.4 |
| 2 | Zn Oxide | 483 | 18.3 |
| 3 | Zn Oxide | 692 | 17.3 |
| 4 | Zn Oxide | 1354 | 15.6 |
| 5 | Zn Stearate | 512 | 18.3 |
| 6 | Zn Stearate | 522 | 16.3 |

*a trace amount of zinc (32) was present due to residual trace amounts in the equipment Utilizing a conventional melt blowing system, the precursor compositions were blown into fibers. The fibers were positioned on a scrim that was positioned on moving belt. Nonwoven webs thus formed. The process employed an extruder with a high compression screw. The (precursor) polyamide die temperature was approximately 323° C. and air was used as the gas.

As noted above, the fibers were spun onto a scrim, which was employed to add integrity to the inventive (nano) fiber web. The polyamides had the RVs listed in Table 1 (before spinning).

The webs were tested for antimicrobial efficacy (according to ISO20743-13:2013). The results are shown in Table 1b.

TABLE 1b

Test Results

| | Staphylococcus aureus | | Klebsiella pneumoniae | |
|---|---|---|---|---|
| | Log reduction (after 24 hours) | % Reduction (after 24 hours) | Log reduction (after 24 hours) | % Reduction (after 24 hours) |
| A | — | — | — | — |
| B | 0.67 | 78.6% | 0.23 | 40.8% |
| C | 0.60 | 74.8% | 1.92 | 98.8% |
| D | 0.37 | 57.5% | 0.11 | 21.5% |
| E | 1.26 | 94.5 | 0.16 | 31.0% |
| 1 | 5.08 | 99.999% | 4.88 | 99.999% |
| 2 | 4.55 | 99.997% | 5.81 | 99.9998% |
| 3 | 5.42 | 99.9996% | 5.64 | 99.9998% |
| 4 | 3.68 | 99.98% | 8.20 | 99.999999% |
| 5 | 4.94 | 99.999% | 6.52 | 99.99997% |
| 6 | 4.90 | 99.999% | 6.54 | 99.99997% |

As shown in Table 1a, the webs that comprised the disclosed amounts of zinc, demonstrated a surprisingly high reduction (after 24 hours) of both *Staphylococcus aureus* and *Klebsiella pneumoniae*, e.g., reduction greater than 99.97% in all cases. In contrast, Comparative examples A-E, which employed little or no zinc compound (or elemental zinc) demonstrated reduction less than 95% for *Staphylococcus aureus* and less than 98.9% for *Klebsiella pneumoniae*—in most cases, well below 80%.

In particular, the webs demonstrated particularly good reduction of *Klebsiella pneumoniae*, e.g., at least 99.999%, versus Comparative Examples A-D (only 98.8% for Comparative Example C and well below 50% for Comparative Examples A, B, and D. Importantly, the disclosed webs demonstrated superior performance over other metals, e.g., copper in Comparative Example E, (99.999+ for Examples 1-6 versus only 31.0% for Comparative Example E).

The log reduction numbers are often used in the industry as a measure of efficacy because these numbers emphasize the differentiation at the upper end of the reduction percentages, e.g., the reduction percentages over 99.9%.

In terms of microbe growth, log reductions convey how effective a product is. The greater the log reduction the more effective the product is at controlling microbe growth. In some cases, during product efficacy testing, the number of colony forming units (CFUs) are counted at the start of the test. Reduction is then measured over a predetermined time, e.g., 24 hours. The result of the difference between the control and the test product is then expressed as the log reduction.

As shown in Table 1b, for *Klebsiella pneumoniae*, the disclosed webs demonstrated a log reduction of well over 2, e.g., greater than 4.5 in most cases. In contrast, Comparative Examples A-E, including Comparative Example E, which employed a copper compound as the antimicrobial agent, demonstrated log reductions less than 2, e.g., less than 1.0 in most cases.

The performance of *Staphylococcus aureus* was also unexpectedly good. The webs demonstrated reduction of *Staphylococcus aureus* of at least 99.98%, versus Comparative Examples A-D (only 94.5% for Comparative Example E and well below 80% for Comparative Examples A-D. Importantly, the disclosed webs demonstrated superior performance over other metals, e.g., copper in Comparative Example E, (99.98+ for Examples 1-6 versus only 94.5% for Comparative Example E).

Also, the disclosed webs demonstrated a log reduction of well over 2, e.g., greater than 3.5 in most cases. In contrast, Comparative Examples A-E, including Comparative Example E, which employed a copper compound as the antimicrobial agent, demonstrated log reductions less than 1.5, e.g., less than 1.0 in most cases.

These Examples and Comparative Examples demonstrate the criticality of the disclosed zinc compound (optionally in the disclosed amounts) versus other antimicrobial agents and versus control samples.

Examples 7 and 8 and Comparative Examples F and G

Nonwoven webs were made using the process described above, with zinc oxide added as a masterbatch. The properties and performance characteristics of several specific samples are shown in Table 2a.

TABLE 2a

Precursor Compositions

| Sample | Zinc compound | Zn amount, ppm | Product RV | Average Fiber diameter, (microns) | Basis weight, (gsm) | TDI | ODI |
|---|---|---|---|---|---|---|---|
| 7 | Zinc oxide | 204 | 22.2 | 0.5017 | 6.75 | N/A | N/A |
| 8 | Zinc oxide | 204 | 22.5 | 0.5732 | 4.25 | N/A | N/A |
| 9 | Zinc oxide | 325 | 23.3 | 0.5097 | 12.20 | 3034 | 137 |

| Sample | Air permeability (CFM/ft$^2$) | Mean pore size diameter (microns) | Mean pore size pressure (PSI) | Filtration Efficiency (%) |
|---|---|---|---|---|
| 7 | 97.98 | 7.647 | 0.888 | 26.37 |
| 8 | 159.80 | 7.742 | 0.892 | 26.06 |
| 9 | 38.32 | 6.380 | 1.056 | 56.83 |

Comparative Examples F and G were prepared similarly, but with no zinc compound.

The webs were tested for antimicrobial efficacy (according to ISO20743-13:2013). The results are shown in Table 2b.

TABLE 2b

Test Results

| | *Staphylococcus aureus* | | *Klebsiella Pneumoniae* | | |
|---|---|---|---|---|---|
| Sample | Log reduction (after 24 hours) | % Reduction (after 24 hours) | Log reduction (after 24 hours) | % Reduction (after 24 hours) | Color change |
| 7 | 4.1 | 99.9906 | 6.1 | 99.9999 | no |
| F | 0.3 | 43.6842 | 3.7 | 99.9802 | yes |
| 9 | 5.2 | 99.9993 | 6.1 | 99.9999 | no |
| G | 0.1 | 15.7894 | 2.6 | 99.7467 | yes |

As shown in Table 2b, the webs that comprised the disclosed amounts of zinc (Examples 7 and 9), demonstrated a surprisingly high reduction (after 24 hours) of both *Staphylococcus aureus* and *Klebsiella pneumoniae*, e.g., reduction greater than 99.990% in all cases. In contrast, Comparative examples F and G, which employed no zinc compound (or elemental zinc) demonstrated reduction less than 50% for *Staphylococcus aureus* and less than 99.99% for *Klebsiella pneumoniae*.

In particular, the webs demonstrated particularly good reduction of *Klebsiella pneumoniae*, e.g., at least 99.9999%, versus Comparative Examples F and G (only 99.9802% for Comparative Example F and 99.7467 for Comparative Example G.

As shown in Table 2b, for *Klebsiella pneumoniae*, the disclosed webs demonstrated a log reduction of well over 3.7, e.g., greater than 4 or greater than 5. In contrast, Comparative Examples F and G, demonstrated log reductions less than 4.

The performance of *Staphylococcus aureus* was also unexpectedly good. The webs demonstrated reduction of *Staphylococcus aureus* of at least 99.990%, versus Comparative Examples F and G (only 43.68% for Comparative Example F and well below 25% for Comparative Example G).

Also, the disclosed webs demonstrated a log reduction of over 3.5, e.g., greater than 4. In contrast, Comparative Examples F and G demonstrated log reductions less than 1.5, e.g., less than 1.0 in most cases.

Examples 1-4 and 6 and Comparative Examples a and C (Die Pressure Reduction)

In addition to the antimicrobial benefits, use of the disclosed amount of zinc has been shown to unexpectedly contribute to process efficiencies, e.g., reductions in die pressure and/or RV improvements.

The precursor polyamide compositions of Examples 1-4 and 6 and Comparative Examples A and C were melt blown into webs as described above. The die pressures that were used are shown in Table 3. The remaining process parameters were kept essentially constant, with Sample A having only a slightly higher throughput.

TABLE 3

Die Pressure and RV

| Sample | Die Pressure, psig | RV |
|---|---|---|
| A | 605 | n/a |
| C | 272 | 30.2 |
| 1 | 235 | 19.4 |
| 2 | 186 | 18.3 |
| 3 | 140 | 17.3 |
| 4 | 127 | 15.6 |
| 6 | 122 | 16.3 |

As shown, the use of the disclosed compositions allowed for significant reductions in die pressures and/or RV, e.g., less than 272 psig (to achieve webs having the same or similar characteristics. This is a significant production advantage because the lower die pressures may contribute to elimination or reduction of fiber formation interruptions. In some cases, higher die pressures, e.g., greater than 272 psig were found to allow more fiber formation interruptions, which is detrimental to web quality. Fiber formation interruptions create defects in the web, which is detrimental for many properties, such as filtration efficiency and water repellency performance. As shown, the Comparative Examples A and C were produced at higher die pressures, e.g., 272 psig and 605 psig. Webs having the same or similar characteristics were thus achieved using these higher die pressures. And the higher die pressures are known to contribute to other defects, e.g., fiber interruptions. Using the disclosed compositions with the zinc content allows the processes to achieve lower die pressures at higher throughputs, which increases the production rates and productivity of the process.

Examples 10 and 11 and Comparative Examples H-M (Die Pressure Reduction)

Precursor polyamide compositions of Examples 10 and 11 and Comparative Examples H-M were prepared, as shown in Table 4. Examples 10 and 11 were prepared using the process described above, with zinc stearate as the zinc compound. Comparative Examples H-M were prepared similarly, but without zinc compound.

These precursor polyamide compositions were melt blown into webs as described above. The die pressures that were used are also shown in Table 4. The remaining process parameters were kept essentially constant.

TABLE 4

Precursor Compositions and Die Pressure

| Sample | Zn compound | Zn amount, ppm | Die Pressure, psig |
|---|---|---|---|
| H | — | 0 | 371 |
| I | — | 0 | 260 |
| J | — | 0 | 371 |
| K | — | 0 | 371 |
| L | — | 0 | 260 |
| M | — | 0 | 501 |
| 10 | Zn Stearate | 3000 | 153 |
| 11 | Zn Stearate | 310 | 184 |

As shown, the use of the disclosed formulations allowed for significant reductions in die pressures, e.g., less than 260 psig (to achieve webs having the same or similar characteristics. Comparative Examples H-M were produced at higher die pressures, e.g., 260 psig or higher, in most cases well over 350 psig. Webs having the same or similar characteristics were thus achieved using these higher die pressures.

EMBODIMENTS

The following embodiments are contemplated. All combinations of features and embodiments are contemplated.

Embodiment 1

A nonwoven polyamide composition having permanent antimicrobial properties comprising: a nonwoven polyamide having an average fiber diameter of less than 25 microns; less than 2000 ppm zinc dispersed within the polyamide; and less than 2000 ppm phosphorus; wherein the weight ratio of the zinc to the phosphorus: is at least 1.3:1; or less than 0.64:1.

Embodiment 2

An embodiment of embodiment 1, wherein the weight ratio of the zinc to the phosphorus is at least 2:1.

Embodiment 3

An embodiment of any one of embodiments 1 and 2, wherein the relative viscosity of the polyamide composition ranges from 10 to 100, e.g., from 20 to 100.

Embodiment 4

An embodiment of any one of embodiments 1-3, wherein the polyamide composition comprises less than 500 ppm of zinc.

Embodiment 5

An embodiment of any one of embodiments 1-4, wherein the polyamide composition comprises a delusterant including at least a portion of the phosphorus.

Embodiment 6

An embodiment of any one of embodiments 1-5, wherein the polyamide composition comprises no phosphorus.

Embodiment 7

An embodiment of any one of embodiments 1-6, wherein the zinc is provided via a zinc compound comprising zinc oxide, zinc acetate, zinc ammonium carbonate, zinc ammonium adipate, zinc stearate, zinc phenyl phosphinic acid, zinc pyrithione and/or combinations thereof.

Embodiment 8

An embodiment of embodiment 7, wherein the zinc compound is not zinc phenyl phosphinate and/or zinc phenyl phosphonate.

Embodiment 9

An embodiment of any one of embodiments 1-8, wherein the phosphorus is provided via a phosphorus compound comprising phosphoric acid, benzene phosphinic acid, benzene phosphonic acid, manganese hypophosphite, sodium hypophosphite, monosodium phosphate, hypophosphorous acid, phosphorous acid, and/or combinations thereof.

Embodiment 10

An embodiment of any one of embodiments 1-9, wherein the polyamide composition comprises less than 500 ppm of zinc, wherein the polymer resin composition comprises a delusterant including at least a portion of the phosphorus, and wherein the polymer resin composition inhibits greater than 90% growth of *Staphylococcus Aureus* as measured by ISO 20743-13.

Embodiment 11

An embodiment of any one of embodiments 1-10, wherein the polyamide comprises a nylon, wherein the zinc is provided via zinc oxide and/or zinc pyrithione, and wherein the relative viscosity of the polyamide composition ranges from 10 to 100, e.g., from 20 to 100.

Embodiment 12

An embodiment of any one of embodiments 1-10, wherein the polyamide comprises nylon-6,6, wherein the zinc is provided via zinc oxide, wherein the weight ratio of zinc to phosphorus is at least 2:1, and wherein the polyamide composition inhibits greater than 95% growth of *Staphylococcus Aureus* as measured by ISO 20743-13.

Embodiment 13

An embodiment of any one of embodiments 1-12, further comprising one or more additional antimicrobial agents comprising silver, tin, copper, and gold, and alloys, oxides, and/or combinations thereof.

Embodiment 14

An embodiment of any one of embodiments 1-13, wherein the melt point of the nonwoven is 225° C. or greater.

Embodiment 15

An embodiment of any one of embodiments 1-14, wherein the nonwoven polyamide is melt spun, spunbonded, electrospun, solution spun, or centrifugally spun.

Embodiment 16

An embodiment of any one of embodiments 1-15, wherein the average fiber diameter of the nonwoven polyamide is 1000 nanometers or less.

Embodiment 17

An embodiment of embodiment 16, wherein no more than 20% of the fibers have a diameter of greater than 700 nanometers.

Embodiment 18

An embodiment of any one of embodiments 1-17, wherein the polyamide comprises nylon 66 or nylon 6/66.

Embodiment 19

An embodiment of any one of embodiments 1-18, wherein the polyamide comprises a high temperature nylon.

Embodiment 20

An embodiment of any one of embodiments 1-19, wherein the polyamide comprises N6, N66, N6T/66, N612, N6/66, N6I/66, N66/6I/6T, N11, and/or N12, wherein "N" means Nylon.

Embodiment 21

An embodiment of any one of embodiments 1-20, wherein the nonwoven polyamide has an Air Permeability Value of less than 600 CFM/ft$^2$.

Embodiment 22

An embodiment of any one of embodiments 1-21, wherein the nonwoven polyamide has a basis weight of 200 GSM or less.

Embodiment 23

An antimicrobial fiber having permanent antimicrobial properties comprising: a nonwoven polyamide having an average fiber diameter of less than 25 microns; less than 2000 ppm zinc dispersed within the polymer; and less than 2000 ppm phosphorus.

Embodiment 24

An embodiment of embodiment 23, wherein the weight ratio of zinc to phosphorus is: at least 1.3:1; or less than 0.64:1.

Embodiment 25

An embodiment of any one of embodiments 23 or 24, wherein the weight ratio of the zinc to the phosphorus is at least 2:1.

Embodiment 26

An embodiment of any one of embodiments 23-25, wherein the fibers have an average diameter less than 20 microns.

Embodiment 27

An embodiment of any one of embodiments 23-26, wherein the polymer comprises less than 2000 ppm zinc.

Embodiment 28

An embodiment of any one of embodiments 23-27, wherein the polymer comprises a delusterant including at least a portion of the phosphorus.

Embodiment 29

An embodiment of any one of embodiments 23-28, wherein the antimicrobial fiber has a zinc retention greater than 70% as measured by a dye bath test.

Embodiment 30

An embodiment of any one of embodiments 23-29, wherein the zinc is a zinc compound comprising zinc oxide, zinc acetate, zinc ammonium carbonate, zinc ammonium adipate, zinc stearate, zinc phenyl phosphinic acid, zinc pyrithione and/or combinations thereof.

Embodiment 31

An embodiment of any one of embodiments 23-30, wherein the phosphorus is a phosphorus compound comprising phosphoric acid, benzene phosphinic acid, benzene phosphonic acid, manganese hypophosphite, sodium hypophosphite, monosodium phosphate, hypophosphorous acid, phosphorous acid, and/or combinations thereof.

Embodiment 32

An embodiment of any one of embodiments 23-31, wherein the polyamide comprises less than 500 ppm of zinc, wherein the polymer comprises a delusterant including at least a portion of the phosphorus, and wherein the antimicrobial fiber inhibits greater than 90% growth of *Staphylococcus Aureus* as measured by ISO 20743-13.

Embodiment 33

An embodiment of any one of embodiments 23-32, wherein the polyamide comprises nylon, wherein the zinc is provided in the form of zinc oxide and/or zinc pyrithione, wherein the relative viscosity of the polymer resin composition ranges from 10 to 100, e.g., from 20 to 100, and wherein the antimicrobial fiber has a zinc retention greater than 80% as measured by a dye bath test, and wherein the fibers have an average diameter less than 18 microns.

Embodiment 34

An embodiment of any one of embodiments 23-33, wherein the polyamide comprises nylon-6,6, wherein the zinc is provided in the form of zinc oxide, wherein the weight ratio of zinc to phosphorus is at least 2:1, wherein the antimicrobial fiber inhibits greater than 95% growth of *Staphylococcus Aureus* as measured by ISO 20743-13, wherein the antimicrobial fiber has a zinc retention greater than 90% as measured by a dye bath test, and wherein the antimicrobial fibers have an average diameter less than 10 microns.

Embodiment 35

An embodiment of any one of embodiments 23-34, wherein the polymer further comprises one or more additional antimicrobial agents comprising silver, tin, copper, and gold, and alloys, oxides, and/or combinations thereof.

Embodiment 36

An embodiment of any one of embodiments 23-35, wherein the melt point of the nonwoven is 225° C. or greater.

Embodiment 37

An embodiment of any one of embodiments 23-36, wherein the nonwoven polyamide is melt spun, spunbonded, electrospun, solution spun, or centrifugally spun.

Embodiment 38

An embodiment of any one of embodiments 23-37, wherein the average fiber diameter of the nonwoven polyamide is 1000 nanometers or less.

Embodiment 39

An embodiment of embodiment 38, wherein no more than 20% of the fibers have a diameter of greater than 700 nanometers.

Embodiment 40

An embodiment of any one of embodiments 23-39, wherein the polyamide comprises nylon 66 or nylon 6/66.

Embodiment 41

An embodiment of any one of embodiments 23-40, wherein the polyamide comprises a high temperature nylon.

Embodiment 42

An embodiment of any one of embodiments 23-41, wherein the polyamide comprises N6, N66, N6T/66, N612, N6/66, N6I/66, N66/6I/6T, N11, and/or N12, wherein "N" means Nylon.

Embodiment 43

An embodiment of any one of embodiments 23-42, wherein the nonwoven polyamide has an Air Permeability Value of less than 600 CFM/ft$^2$.

Embodiment 44

An embodiment of any one of embodiments 23-43, wherein the nonwoven polyamide has a basis weight of 200 GSM or less.

Embodiment 45

A process for preparing an antimicrobial nonwoven polyamides having permanent antimicrobial properties, the process comprising: preparing an aqueous monomer solution forming a polyamide; adding less than 2000 ppm zinc dispersed within the aqueous monomer solution; adding less than 2000 ppm phosphorus; polymerizing the aqueous monomer solution to form the polyamide; spinning the polyamide to form antimicrobial polyamide fibers; and forming the antimicrobial polyamide fibers into antimicrobial nonwoven polyamides having a fiber diameter of less than 25 microns; wherein the weight ratio of zinc to phosphorus is: at least 1.3:1 or less than 0.64:1.

Embodiment 46

An embodiment of embodiments 45, wherein the polymer comprises less than 2000 ppm zinc.

Embodiment 47

An embodiment of any one of embodiments 45 or 46, wherein the antimicrobial fiber has a zinc retention greater than 70% as measured by a dye bath test.

Embodiment 48

An embodiment of any one of embodiments 45-47, wherein the step of adding phosphorus comprises adding a delusterant including at least a portion of the phosphorus.

Embodiment 49

An embodiment of any one of embodiments 45-48, wherein the polyamide is melt spun by way of melt blowing through a die into a high velocity gaseous stream.

Embodiment 50

An embodiment of any one of embodiments 45-49, wherein the polyamide is melt spun by 2-phase propellant-gas spinning, including extruding the polyamide composition in liquid form with pressurized gas through a fiber-forming channel.

Embodiment 51

An embodiment of any one of embodiments 45-50, wherein the nonwoven is formed by collecting the fibers on a moving belt.

Embodiment 52

An embodiment of any one of embodiments 45-51, wherein the relative viscosity of the polyamide in the nonwoven is reduced as compared to the polyamide prior to spinning and forming the nonwoven.

Embodiment 53

An embodiment of any one of embodiments 45-52, wherein the relative viscosity of the polyamide in the nonwoven is the same or increased as compared to the polyamide prior to spinning and forming the nonwoven.

Embodiment 54

An embodiment of any one of embodiments 45-53, wherein the nonwoven comprises a nylon 66 polyamide which is melt spun and formed into said nonwoven, wherein the nonwoven has a TDI of at least 20 ppm and an ODI of at least 1 ppm.

Embodiment 55

An embodiment of any one of embodiments 45-54, wherein the nonwoven comprises a nylon 66 polyamide which is melt spun into fibers and formed into said nonwoven, wherein no more than 20% of the fibers have a diameter of greater than 25 microns.

Embodiment 56

An embodiment of any one of embodiments 45-49, wherein the polyamide is melt spun, spunbonded, electrospun, solution spun, or centrifugally spun.

Embodiment 57

A nonwoven polyamide structure having antimicrobial properties comprising: nonwoven polyamide fibers comprising less than 4000 ppm zinc dispersed within the nonwoven polyamide fibers; and less than 2000 ppm phosphorus; wherein the fibers have an average fiber diameter of less than 25 microns; and wherein the polyamide structure demonstrates a *Staphylococcus Aureus* reduction of at least 90%, as measured by ISO 20743-13.

Embodiment 58

An embodiment of embodiment 57, wherein the weight ratio of the zinc to the phosphorus is at least 1.3:1; or less than 0.64:1.

Embodiment 59

An embodiment of any one of embodiments 57 or 58, wherein the relative viscosity of the polyamide composition is less than 100.

Embodiment 60

An embodiment of any one of embodiments 57-59, wherein the polyamide composition comprises less than 3100 ppm of zinc, wherein the polyamide composition comprises a delusterant including at least a portion of the phosphorus, and wherein the polyamide demonstrates a *Staphylococcus Aureus* reduction of at least 90%, as measured by ISO 20743-13.

Embodiment 61

An embodiment of any one of embodiments 57-60, wherein the nonwoven polyamide is melt spun, spunbonded, electrospun, solution spun, or centrifugally spun.

Embodiment 62

An embodiment of any one of embodiments 57-61, wherein no more than 20% of the fibers have a diameter of greater than 700 nanometers.

Embodiment 63

An embodiment of any one of embodiments 57-62, wherein the polyamide comprises nylon 66 or nylon 6/66.

Embodiment 64

Antimicrobial fibers having antimicrobial properties comprising less than 4000 ppm zinc dispersed within the nonwoven polyamide fibers; less than 2000 ppm phosphorus, wherein the fibers have an average fiber diameter of less than 25 microns; and wherein the polyamide structure demonstrates a *Staphylococcus Aureus* reduction of at least 90%, as measured by ISO 20743-13.

Embodiment 65

An embodiment of embodiment 64, wherein the weight ratio of zinc to phosphorus is: at least 1.3:1; or less than 0.64:1.

Embodiment 66

An embodiment of any one of embodiment 64 or 65, wherein the fibers have an average diameter less than 20 microns.

Embodiment 67

An embodiment of any one of embodiments 64-66, wherein the nonwoven polyamide comprises less than 3100 ppm of zinc.

Embodiment 68

An embodiment of any one of embodiments 64-67, wherein the antimicrobial fibers have a zinc retention greater than 70% as measured by a dye bath test.

Embodiment 69

An embodiment of any one of embodiments 64-68, wherein the nonwoven polyamide comprises less than 3200 ppm of zinc, wherein the polymer comprises a delusterant including at least a portion of the phosphorus, and wherein the antimicrobial fibers demonstrates a *Staphylococcus Aureus* reduction of at least 90%, as measured by ISO 20743-13.

Embodiment 70

An embodiment of any one of embodiments 64-69, wherein the nonwoven polyamide is melt spun, spunbonded, electrospun, solution spun, or centrifugally spun.

Embodiment 71

An embodiment of any one of embodiments 64-70, wherein the polyamide comprises nylon 66 or nylon 6/66.

Embodiment 72

A process for preparing an antimicrobial nonwoven polyamide structure having permanent antimicrobial properties, the process comprising: preparing precursor polyamide optionally comprising an aqueous monomer solution; dispersing less than 4000 ppm zinc within the precursor polyamide; dispersing less than 2000 ppm phosphorus within the precursor polyamide; polymerizing the precursor polyamide to form a polyamide composition; spinning the polyamide composition to form antimicrobial polyamide fibers; and forming the antimicrobial polyamide fibers into the antimicrobial nonwoven structure having a fiber diameter of less than 25 microns.

Embodiment 73

An embodiment of embodiment 72, wherein the antimicrobial nonwoven polyamides have a zinc retention greater than 70% as measured by a dye bath test.

Embodiment 74

An embodiment of any one of embodiment 72 or 73, wherein the weight ratio of zinc to phosphorus is: at least 1.3:1; or less than 0.64:1.

Embodiment 75

An embodiment of any one of embodiments 72-74, wherein the polyamide is melt spun by way of melt blowing through a die into a high velocity gaseous stream.

Embodiment 76

An embodiment of any one of embodiments 72-75, wherein the nonwoven comprises a nylon 66 polyamide which is melt spun into fibers and formed into said nonwoven, wherein no more than 20% of the fibers have a diameter of greater than 25 microns.

Embodiment 77

An embodiment of any one of embodiments 72-76, wherein the polyamide is melt spun, spunbonded, electrospun, solution spun, or centrifugally spun.

Embodiment 78

A nonwoven polyamide structure having antimicrobial properties comprising: nonwoven polyamide fibers having an average fiber diameter of less than 25 microns; less than 4000 ppm zinc dispersed within the nonwoven polyamide fibers; wherein the polyamide composition demonstrates a *Staphylococcus Aureus* reduction of at least 90%, as measured by ISO 20743-13.

Embodiment 79

A process for preparing an antimicrobial nonwoven polyamide structure having antimicrobial properties, the process comprising: preparing a formulation comprising a polyamide, less than 4000 ppm zinc dispersed within the polyamide; and less than 2000 ppm phosphorus dispersed within the polyamide; spinning the formulation to form antimicrobial polyamide fibers having a fiber diameter of less than 25 microns; and forming the antimicrobial polyamide fibers into antimicrobial nonwoven polyamide structure; wherein the fibers were spun using a die pressure less than 275 psig While the invention has been described in detail, modifications within the spirit and scope of the invention will be readily apparent to those of skill in the art. In view of the foregoing discussion, relevant knowledge in the art and references discussed above in connection with the Background and Detailed Description, the disclosures of which are all incorporated herein by reference. In addition, it should be understood that embodiments of the invention and portions of various embodiments and various features recited below and/or in the appended claims may be combined or interchanged either in whole or in part. In the foregoing descriptions of the various embodiments, those embodiments which refer to another embodiment may be appropriately combined with other embodiments as will be appreciated by one of skill in the art.

We claim:

1. A nonwoven polyamide structure having antimicrobial properties comprising:
    nonwoven polyamide fibers comprising a polyamide composition comprising:
    less than 4000 ppm zinc dispersed within the nonwoven polyamide fibers; and
    less than 2000 ppm phosphorus,
        wherein the fibers have an average fiber diameter of less than 20 microns;
        wherein the zinc is provided via a zinc compound and the phosphorus is provided via a phosphorus compound different from the zinc compound; and
        wherein the polyamide structure demonstrates a *Staphylococcus Aureus* reduction of at least 90%, as measured by ISO 20743-13.

2. The nonwoven polyamide structure of claim 1, wherein the weight ratio of the zinc to the phosphorus is at least 1.3:1; or less than 0.64:1.

3. The nonwoven polyamide structure of claim 1, wherein the relative viscosity of the polyamide composition is less than 100.

4. The nonwoven polyamide structure of claim 1, wherein the polyamide composition comprises less than 3100 ppm of zinc, wherein the polyamide composition comprises a delusterant including at least a portion of the phosphorus, and wherein the polyamide demonstrates a *Staphylococcus Aureus* reduction of at least 90%, as measured by ISO 20743-13.

5. The nonwoven polyamide structure of claim 1, wherein no more than 20% of the fibers have a diameter of greater than 700 nanometers.

6. The nonwoven polyamide structure of claim 1, wherein the polyamide comprises nylon 66 or nylon 6/66.

7. Antimicrobial fibers having antimicrobial properties comprising:
    a polymer;
    less than 4000 ppm zinc dispersed within the polymer; and
    less than 2000 ppm phosphorus,
        wherein the fibers have an average fiber diameter of less than 20 microns;
        wherein the zinc is provided via a zinc compound and the phosphorus is provided via a phosphorus compound different from the zinc compound; and
        wherein the antimicrobial fibers demonstrate a *Staphylococcus Aureus* reduction of at least 90%, as measured by ISO 20743-13.

8. The antimicrobial fibers of claim 7, wherein the weight ratio of zinc to phosphorus is: at least 1.3:1; or less than 0.64:1.

9. The antimicrobial fibers of claim 7, wherein the antimicrobial fibers comprise less than 3100 ppm of zinc.

10. The antimicrobial fibers of claim 7, wherein the antimicrobial fibers have a zinc retention greater than 70% as measured by a dye bath test.

11. The antimicrobial fibers of claim 7, wherein the antimicrobial fibers comprise less than 3200 ppm of zinc, wherein the antimicrobial fibers comprise a delusterant including at least a portion of the phosphorus, and wherein the antimicrobial fibers demonstrates a *Staphylococcus Aureus* reduction of at least 90%, as measured by ISO 20743-13.

12. The antimicrobial fibers of claim 7, wherein the antimicrobial fibers comprise nylon 66 or nylon 6/66.

13. A process for preparing an antimicrobial nonwoven polyamide structure having permanent antimicrobial properties, the process comprising:
    preparing precursor polyamide comprising an aqueous monomer solution;
    dispersing less than 4000 ppm zinc within the precursor polyamide;
    dispersing less than 2000 ppm phosphorus within the precursor polyamide;
    wherein the zinc is provided via a zinc compound and the phosphorus is provided via a phosphorus compound different from the zinc compound;
    polymerizing the precursor polyamide to form a polyamide composition;
    spinning the polyamide composition to form antimicrobial polyamide fibers; and
    forming the antimicrobial polyamide fibers into the antimicrobial nonwoven structure having a fiber diameter of less than 20 microns; and
    wherein the polyamide structure demonstrates a *Staphylococcus Aureus* reduction of at least 90%, as measured by ISO 20743-13.

14. The process of claim 13, wherein the antimicrobial nonwoven polyamides have a zinc retention greater than 70% as measured by a dye bath test.

15. The process of claim 13, wherein the weight ratio of zinc to phosphorus is: at least 1.3:1 or less than 0.64:1.

16. The process of claim 13, wherein the polyamide is melt spun by way of melt blowing through a die into a high velocity gaseous stream.

17. A process for preparing an antimicrobial nonwoven polyamide structure having antimicrobial properties, the process comprising:
    preparing a formulation comprising a polyamide, less than 4000 ppm zinc dispersed within the polyamide; and less than 2000 ppm phosphorus dispersed within the polyamide, wherein the zinc is provided via a zinc compound and the phosphorus is provided via a phosphorus compound different from the zinc compound;

spinning the formulation to form antimicrobial polyamide fibers having a fiber diameter c less than 20 microns; and forming the antimicrobial polyamide fibers into antimicrobial nonwoven polyamide structure;

wherein the fibers were spun using a die pressure less than 275 psig; and wherein the polyamide structure demonstrates a *Staphylococcus Aureus* reduction of at least 90%, as measured by ISO 20743-13.

* * * * *